(12) United States Patent
Jung et al.

(10) Patent No.: US 12,514,255 B2
(45) Date of Patent: Jan. 6, 2026

(54) SPRING ROLL MAKING APPARATUS

(71) Applicants: DAEHAN MACHINERY CO., LTD., Gimpo-si (KR); CJ CHEILJEDANG CORPORATION, Seoul (KR)

(72) Inventors: Byung Chun Jung, Gimpo-Si (KR); Jae Won Seong, Incheon (KR); Bong Jin Jang, Seoul (KR)

(73) Assignees: DAEHAN MACHINERY CO., LTD., Gimpo-si (KR); CJ CHEILJEDANG CORPORATION, Seoul (KR)

( * ) Notice: Subject to any disclaimer, the term of this patent is extended or adjusted under 35 U.S.C. 154(b) by 826 days.

(21) Appl. No.: 17/757,179

(22) PCT Filed: Oct. 28, 2020

(86) PCT No.: PCT/KR2020/014794
§ 371 (c)(1),
(2) Date: Jun. 10, 2022

(87) PCT Pub. No.: WO2021/118051
PCT Pub. Date: Jun. 17, 2021

(65) Prior Publication Data
US 2023/0026314 A1    Jan. 26, 2023

(30) Foreign Application Priority Data

Dec. 12, 2019  (KR) .................. 10-2019-0165424
Dec. 12, 2019  (KR) .................. 10-2019-0165425
Dec. 12, 2019  (KR) .................. 10-2019-0165426

(51) Int. Cl.
*A21C 9/06* (2006.01)
*A21C 11/10* (2006.01)
*A23L 7/10* (2016.01)

(52) U.S. Cl.
CPC .............. *A21C 9/063* (2013.01); *A21C 11/10* (2013.01); *A23L 7/10* (2016.08)

(58) Field of Classification Search
CPC ............ A21C 9/063; A21C 11/10; A23L 7/10
(Continued)

(56) References Cited

U.S. PATENT DOCUMENTS

2012/0152130 A1\*  6/2012  Robert .................. A21C 9/063
                                                         99/450.7
2015/0010679 A1\*  1/2015  Strong ...................... A23L 5/15
                                                         99/468
2016/0066587 A1   3/2016  Trinh et al.

FOREIGN PATENT DOCUMENTS

JP   S60-114155 A    6/1985
JP   H02207774 A     8/1990
(Continued)

OTHER PUBLICATIONS

International Search Report issued in International Application No. PCT/KR2020/014794, mailed on Feb. 18, 2021 (6 pages).
(Continued)

*Primary Examiner* — Phuong T Nguyen
(74) *Attorney, Agent, or Firm* — Osha Bergman Watanabe & Burton LLP

(57) ABSTRACT

The present invention relates to a spring roll making apparatus comprising: a supply unit for supplying rice paper; a moving unit for moving the rice paper supplied by the supply unit; a softening unit for inducing softening of the rice paper moved by the moving unit; an application unit for applying a filling onto the rice paper softened by the softening unit; a folding unit for folding the rice paper on which the filling placed; and a rolling unit for rolling up the rice paper folded by the folding unit, whereby spring rolls can be mass-produced.

20 Claims, 21 Drawing Sheets

(58) Field of Classification Search
USPC .................................. 99/450.6, 450.7, 494
See application file for complete search history.

(56) References Cited

FOREIGN PATENT DOCUMENTS

| | | | |
|---|---|---|---|
| JP | 2010187564 | A | 9/2010 |
| KR | 20040028544 | A | 4/2004 |
| KR | 20040099610 | A | 12/2004 |
| KR | 2009005679 | A | 1/2009 |
| KR | 20090040503 | A | 4/2009 |
| KR | 20130128297 | A | 11/2013 |
| KR | 101528560 | B1 | 6/2015 |
| KR | 101862470 | B1 | 5/2018 |
| KR | 20180077530 | A | 7/2018 |
| KR | 20180077531 | A | 7/2018 |
| KR | 20180077532 | A | 7/2018 |
| KR | 200487418 | Y1 | 9/2018 |
| KR | 20190055938 | A | 5/2019 |
| KR | 102021293 | B1 | 9/2019 |
| KR | 20200004547 | A | 1/2020 |
| KR | 20200004548 | A | 1/2020 |
| KR | 20200004549 | A | 1/2020 |
| WO | 2019/141928 | A1 | 7/2019 |
| WO | 2020/009326 | A1 | 1/2020 |

OTHER PUBLICATIONS

Written Opinion issued in International Application No. PCT/KR2020/014794, mailed on Feb. 18, 2021 (4 pages).
Extended European Search Report issued in corresponding EP Application No. 20898734.7 dated Dec. 22, 2022 (6 pages).
Office Action issued in Vietnamese Application No. 1-2022-04253, mailed on Jul. 18, 2025 (5 pages).
Office Action issued in Korean Application No. 101862470, mailed on Apr. 11, 2018 (34 Pages).

* cited by examiner

SPRING ROLL MAKING APPARATUS

TECHNICAL FIELD

The present invention relates to a spring roll making apparatus, and more particularly, to a spring roll making apparatus capable of rapidly making spring rolls in large quantities through an automated process.

BACKGROUND ART

In general, spring rolls are a food made by making pancakes using wheat flour or rice flour, putting stuffing in the pancakes, and frying the pancakes. These spring rolls are called Chungwon in China, Cha gio in Vietnam, and Harumaki in Japan.

Chungwon is a kind of dumpling and is made by making pancakes using a mixture of wheat flour, starch powder, and eggs, and putting stuffing made by mixing vegetables such as shiitakes, bean sprouts, and bamboo shoots, minced pork, and shrimp in the pancakes, rolling the pancakes, and then frying the pancakes in oil.

Cha gio is a food made by putting minced pork, shrimp, and vegetables such as carrots, green peppers, and mushrooms, in a Vietnamese spring roll called a rice paper, rolling the Vietnamese spring roll, and then frying the Vietnamese spring roll in oil. This Cha gio is made by forming the Vietnamese spring roll in a diamond shape, putting stuffing in a location slightly below the center, folding a front part, folding both wing parts inward, rolling the Vietnamese spring roll, and then frying the Vietnamese spring roll in oil.

However, in the related art, since it is difficult to automatically make the spring rolls such as the Cha gio and the spring rolls are manually made, the production amount cannot be increased. Therefore, it is required to fix this problem.

The background technology of the present disclosure is disclosed in Korean Patent Publication No. 2004-0028544 (registered on Apr. 3, 2004, title of the invention: Spring roll and making method therefor).

DISCLOSURE

Technical Problem

The present invention is directed to providing a spring roll making apparatus capable of rapidly making spring rolls in large quantities through an automated process.

Technical Solution

One aspect of the present invention provides a spring roll making apparatus including a supply unit that supplies each rice paper, a movement unit that moves the rice paper supplied through the supply unit, a softening unit that induces softening of the rice paper moved through the movement unit, an input unit that inputs stuffing into the rice paper softened by the softening unit, a folder unit that folds the rice paper on which the stuffing is seated, and a rotation unit that rolls the rice paper folded by the folder unit.

The supply unit may include a supply guide unit, a supply replenishment unit that moves the rice paper along the supply guide unit and replenishes the rice paper, a supply standby unit that is mounted on the supply guide unit and maintains the rice paper supplied from the supply replenishment unit in a standby state, and a supply transfer unit that is mounted on the supply guide unit and moves each of the rice papers stacked on the supply standby unit to the softening unit.

The supply guide unit may include a guide duct part, a guide rod part that is disposed in a lengthwise direction of the guide duct part and guides the supply replenishment unit, and a guide rail part that is formed in the guide duct part and guides the rice paper.

The supply replenishment unit may include a replenishment driving part that is mounted on the supply guide unit and is driven to provide power when power is applied, and a replenishment guide part that reciprocates in a lengthwise direction of the supply guide unit by the replenishment driving part and guides the rice paper to the supply standby unit.

The supply standby unit may include a standby elevation part that is mounted on the supply guide unit, is vertically moved, and moves the rice paper moved through the supply replenishment unit upward, and a standby support part that is mounted on the supply guide unit and supports an uppermost end of the rice paper moved upward.

The supply transfer unit may include a transfer adsorption part that adsorbs an uppermost rice paper of the stacked rice papers, and a transfer belt part that moves the rice paper supplied through the transfer adsorption part.

The softening unit may include a softening spraying unit that sprays hot water onto the rice paper moved through the supply unit, and a softening steam unit that provides steam to the rice paper.

The softening steam unit may include a plurality of steam stand parts, a steam water tank part that is supported by the steam stand parts, covers the movement unit, and stores water, a steam heating part that is mounted on the steam water tank part and heats the stored water, and a steam circulation part that is mounted on the steam water tank part and circulates steam.

The input unit may include an input provision unit that supplies the stuffing, an input cutting unit that cuts and subdivides the stuffing discharged from the input provision unit, an input belt unit that guides the subdivided stuffing, an input stopper unit that stops the stuffing moved through the input belt unit, and an input dropping unit that drops the stuffing, of which movement is stopped by the input stopper unit, from the input belt unit.

The input provision unit may include a provision injection part into which the stuffing is input, a provision guide part that is connected to the provision injection part and guides the stuffing, and a provision operation part that is inserted into the provision guide part and discharges the stuffing stored in the provision guide part to an end of the provision guide part.

The input cutting unit may include a cutting driving part of which a vertical length is variable, a cutting link part that is rotatably mounted on the cutting driving part and has a height adjusted according to a length of the cutting driving part, a cutting blade part that is formed in the cutting link part and cuts the stuffing, and a cutting rotation part that is connected to the cutting link part and varies a length thereof to rotate the cutting link part.

The input dropping unit may include a dropping operation part that is disposed above the input belt unit and has a variable length, and a dropping plate part that is linearly moved by the dropping operation part and pushes the stuffing stopped in the input belt unit by the input stopper unit.

The input unit may further include an input alignment unit that aligns the stuffing dropped onto the rice paper.

The input alignment unit may include an alignment rotation part rotatably mounted on the movement unit, and an alignment rod part that protrudes from the alignment rotation part and aligns the stuffing while in contact with the stuffing dropped onto the rice paper.

The folder unit may include a folder support unit that supports the stuffing, a folder pressing unit that presses a left wing and a right wing of the rice paper, and a folder spraying unit that sprays air onto the left wing and the right wing of the rice paper.

The folder support unit may include a folder driving part that is disposed above the moved rice paper and is moved in a progress direction of the rice paper, and a folder contact part that is mounted on the folder driving part and presses the stuffing while moving in the progress direction of the rice paper.

The folder pressing unit may include a pressing operation part that is disposed above the moved rice paper and has a variable length, a pressing rod part that is mounted on the pressing operation part and has a height adjusted as the pressing operation part is operated, and a pressing part that is mounted on the pressing rod part and presses the left wing and the right wing of the rice paper.

The rotation unit may include a rotation support unit that is mounted on the movement unit and disposed above the rice paper, and a rotation chain unit that is mounted on the rotation support unit, has a length in a progress direction of the rice paper, and guides the moved rice paper to be caught and dried.

The rotation chain unit may include a plurality of chain pulley parts rotatably mounted on the rotation support unit, and a chain contact part that rotates in a caterpillar manner while being wound on the chain pulley parts and rolls the rice paper moved through the movement unit while in contact with the rice paper.

The rotation unit may further include a rotation spraying unit that sprays a gas to the rice paper moved through the movement unit, and a rotation discharge unit that prevents the rice paper from deviating from a set path of being moved to the rotation chain unit.

Advantageous Effects

A spring roll making apparatus according to the present invention can rapidly make spring rolls in large quantities through an automated process, reduce manufacturing costs due to mass production, and maintain uniform quality.

MODES OF THE INVENTION

Figure 1:
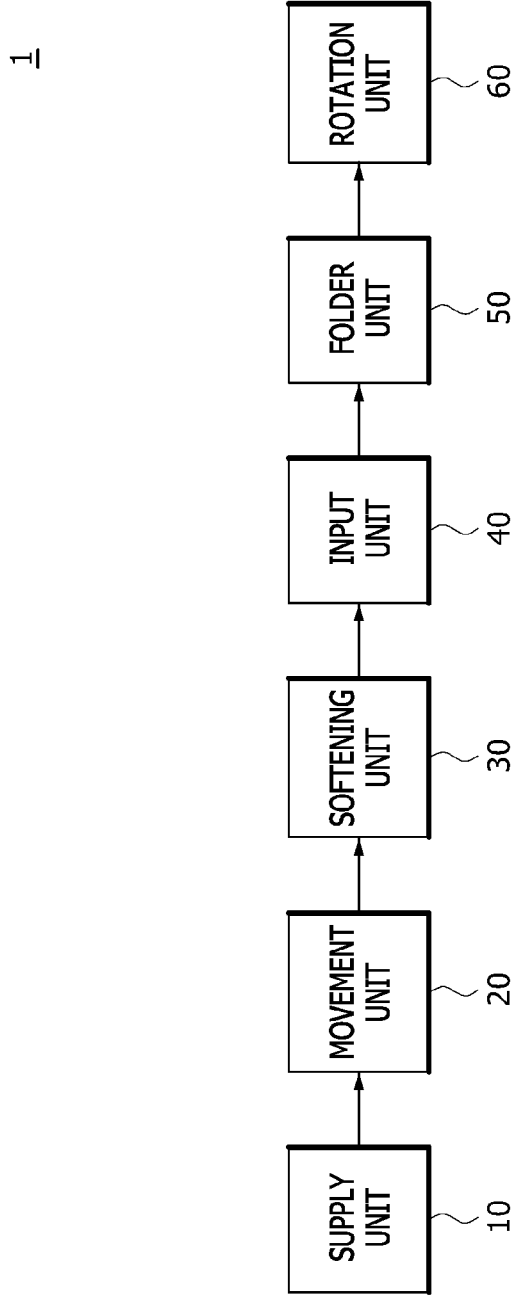
FIG. 1 is a block diagram schematically illustrating a spring roll making apparatus according to an embodiment of the present invention.

Hereinafter, embodiments of a spring roll making apparatus according to the present invention will be described with reference to the accompanying drawings. In this process, the thicknesses of lines or the sizes of components illustrated in the drawings may be exaggerated for clarity and convenience of description. Further, terms described below are defined in consideration of functions in the present invention and may change according to the intention or custom of a user or an operator. Therefore, definitions of these terms should be made based on the contents throughout the present specification.

Figure 2:
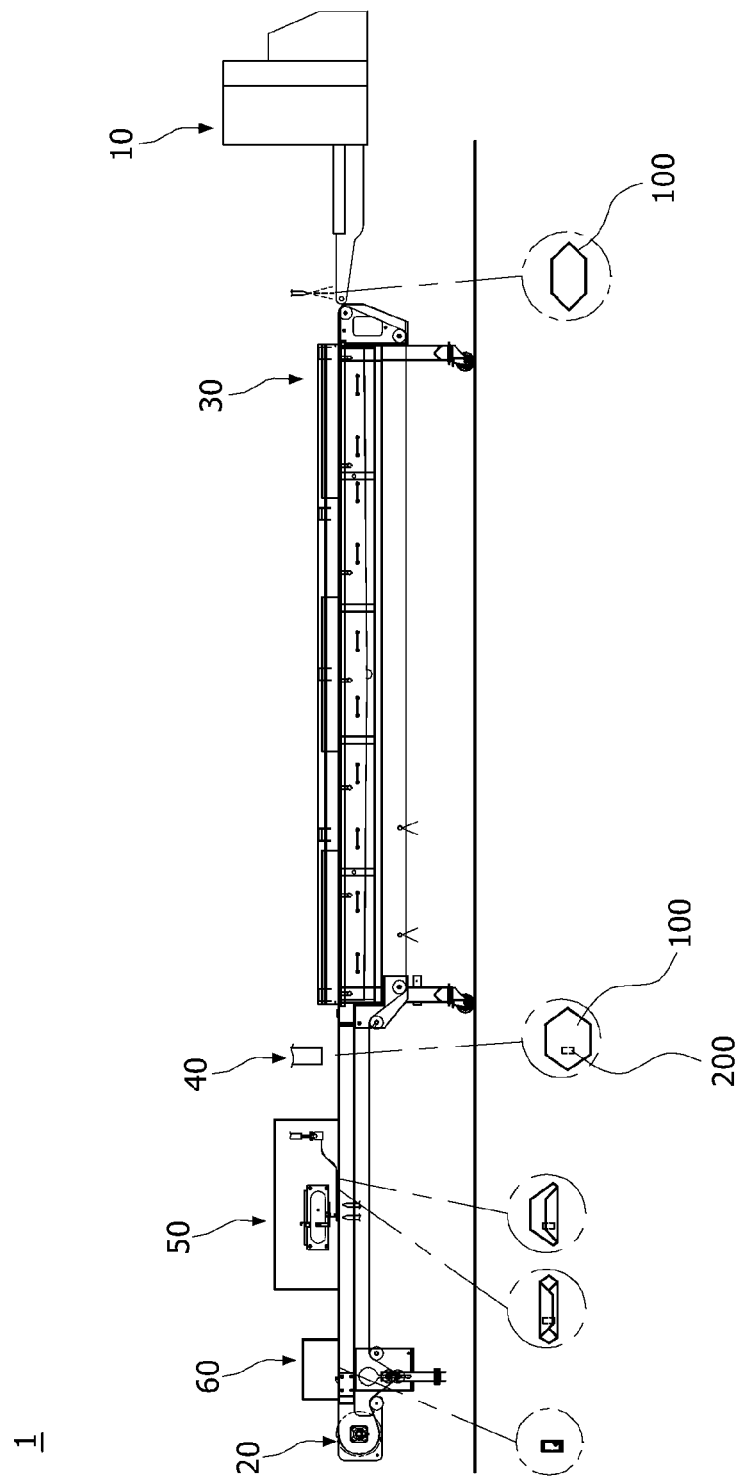
FIG. 2 is a view schematically illustrating the spring roll making apparatus according to an embodiment of the present invention.

FIG. 1 is a block diagram schematically illustrating a spring roll making apparatus according to an embodiment of the present invention, and FIG. 2 is a view schematically illustrating the spring roll making apparatus according to the embodiment of the present invention. Referring to FIGS. 1 and 2, a spring roll making apparatus 1 according to the embodiment of the present invention includes a supply unit 10, a movement unit 20, a softening unit 30, an input unit 40, a folder unit 50, and a rotation unit 60.

The supply unit 10 supplies each rice paper 100. As an example, the supply unit 10 may supply each of the rice papers 100 that are dried and stacked. The rice paper 100 may have a diamond shape or a shape in which both ends of a rectangle have a triangular shape, and in addition, the shape may be changed according to a working environment.

The movement unit 20 moves the rice paper 100 supplied through the supply unit 10. As an example, the movement unit 20 may be disposed adjacent to the supply unit 10 and move the rice paper 100 in a belt conveyor method. In this case, a plurality of holes through which a fluid may pass may be formed in a belt. Meanwhile, while the rice paper 100 is continuously moved through the movement unit 20, the softening unit 30, the input unit 40, the folder unit 50, and the rotation unit 60 may be sequentially operated to make a spring roll.

The softening unit 30 induces softening of the rice paper 100 moved through the movement unit 20. As an example, the softening unit 30 may supply moisture to the dried rice paper 100 so that the rice paper 100 may be smoothly folded.

The input unit 40 inputs stuffing 200 to the rice paper 100 softened by the softening unit 30. As an example, while the softened rice paper 100 is moved through the movement unit 20, the input unit 40 may seat a predetermined amount of the stuffing 200 on the rice paper 100.

The folder unit 50 folds the rice paper 100 on which the stuffing 200 is seated and which is continuously moved by the movement unit 20. As an example, the folder unit 50 may induce the stuffing 200 so that both wings of the rice paper 100 are folded and stacked on an upper side of the stuffing 200.

The rotation unit 60 is disposed above the movement unit 20, rolls the rice paper 100 that is folded while passing through the folder unit 50, and then moved through the movement unit 20. The rotation unit 60 may forcibly rotate the rice paper 100 covering the stuffing 200, and thus the stuffing 200 may be surrounded by the rice paper 100.

Figure 3:
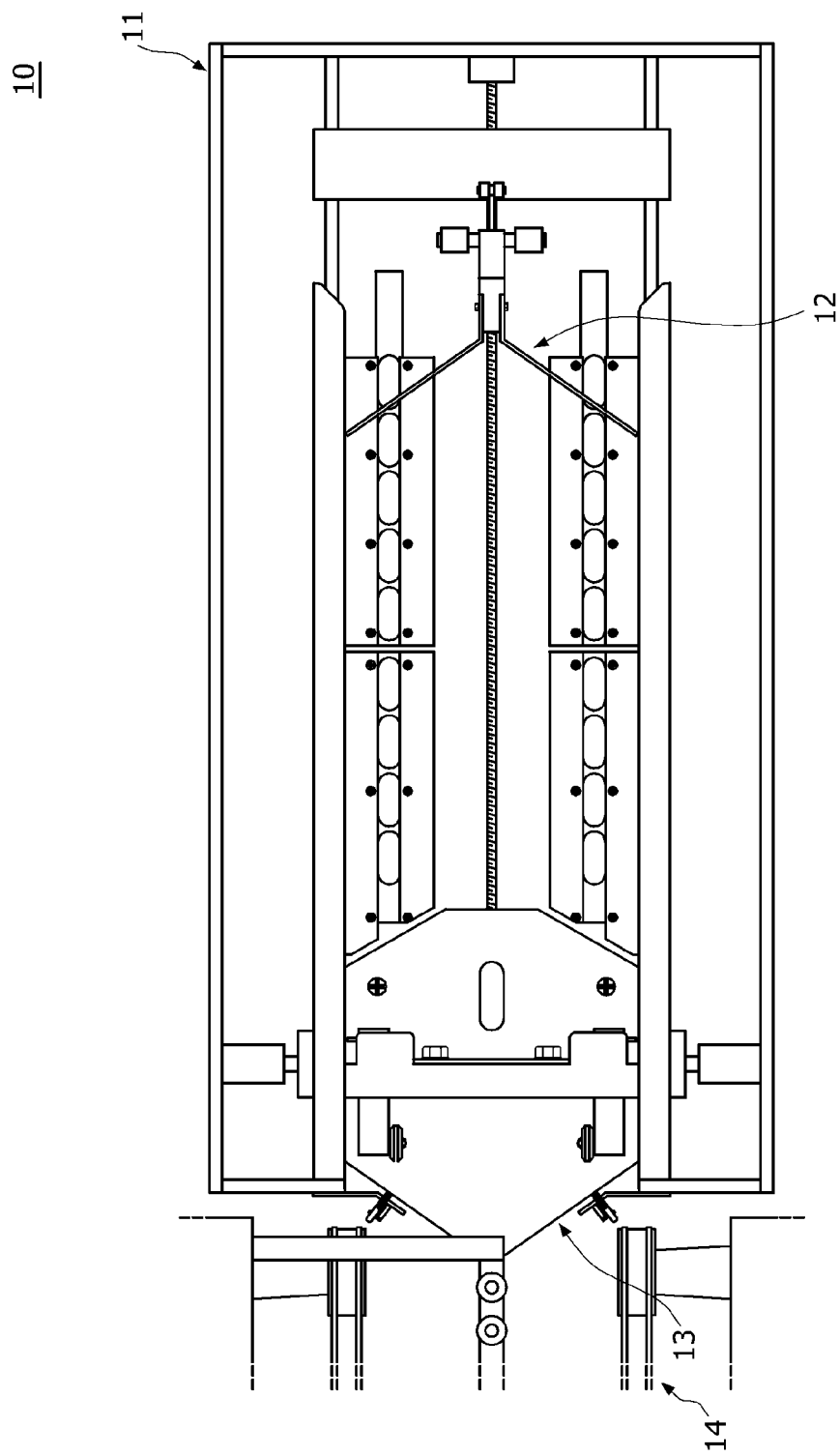
FIG. 3 is a plan view schematically illustrating a supply unit according to an embodiment of the present invention.

FIG. 3 is a plan view schematically illustrating a supply unit according to an embodiment of the present invention. Referring to FIG. 3, the supply unit 10 according to the embodiment of the present invention includes a supply guide unit 11, a supply replenishment unit 12, a supply standby unit 13, and a supply transfer unit 14.

The supply guide unit 11 guides the movement of the rice paper 100, and the supply replenishment unit 12 moves the rice paper 100 to the supply standby unit 13, that is, its destination, while reciprocating along the supply guide unit 11. Meanwhile, a worker may perform a replenishment operation of stacking a large number of the rice papers 100 on the supply replenishment unit 12.

The supply standby unit 13 is mounted on the supply guide unit 11 and maintains the rice paper 100 supplied from the supply replenishment unit 12 in a standby state. The supply transfer unit 14 mounted on the supply guide unit 11 moves each of the rice papers 100 stacked on the supply standby unit 13 to the softening unit 30. As an example, the supply transfer unit 14 may input the uppermost rice paper of the stacked rice papers 100 to the movement unit 20, and the rice paper 100 seated on the movement unit 20 may sequentially pass through the softening unit 30, the input unit 40, the folder unit 50, and the rotation unit 60.

Figure 4:
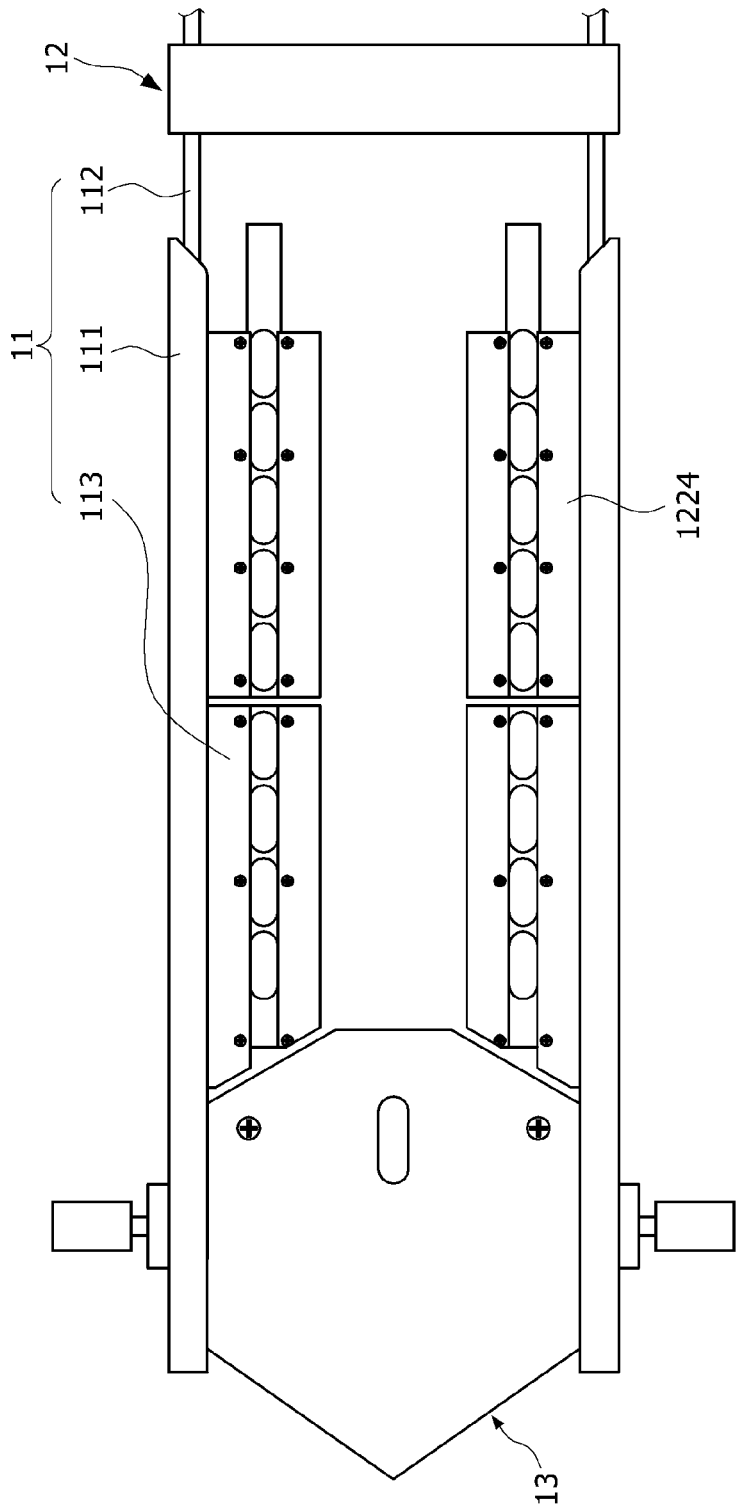
FIG. 4 is a view schematically illustrating a supply guide unit according to an embodiment of the present invention.

FIG. 4 is a view schematically illustrating a supply guide unit according to an embodiment of the present invention. Referring to FIG. 4, the supply guide unit 11 according to the embodiment of the present invention includes a guide duct part 111, a guide rod part 112, and a guide rail part 113.

The guide duct part 111 may have an open upper side and an open lower side, and the supply replenishment unit 12, the supply standby unit 13, and the supply transfer unit 14 may be mounted on the guide duct part 111. As an example, the rice paper 100 may be moved inside the guide duct part 111, the supply replenishment unit 12 may be disposed at one end of the guide duct part 111, and the supply standby unit 13 may be disposed at the other end of the guide duct part 111. Further, the supply replenishment unit 12 may move the stacked rice papers 100 to the supply standby unit 13.

The guide rod part 112 is disposed in a lengthwise direction of the guide duct part 111 and guides the supply replenishment unit 12. As an example, a pair of guide rod parts 112 may be arranged apart from each other.

The guide rail part 113 is formed in the guide duct part 111 and guides the rice paper 100. As an example, the guide rail part 113 may be disposed between the supply replenishment unit 12 and the supply standby unit 13 and support the lowermost one of the stacked rice papers 100. The guide rail part 113 may be disposed above the guide rod part 112.

Figure 5:
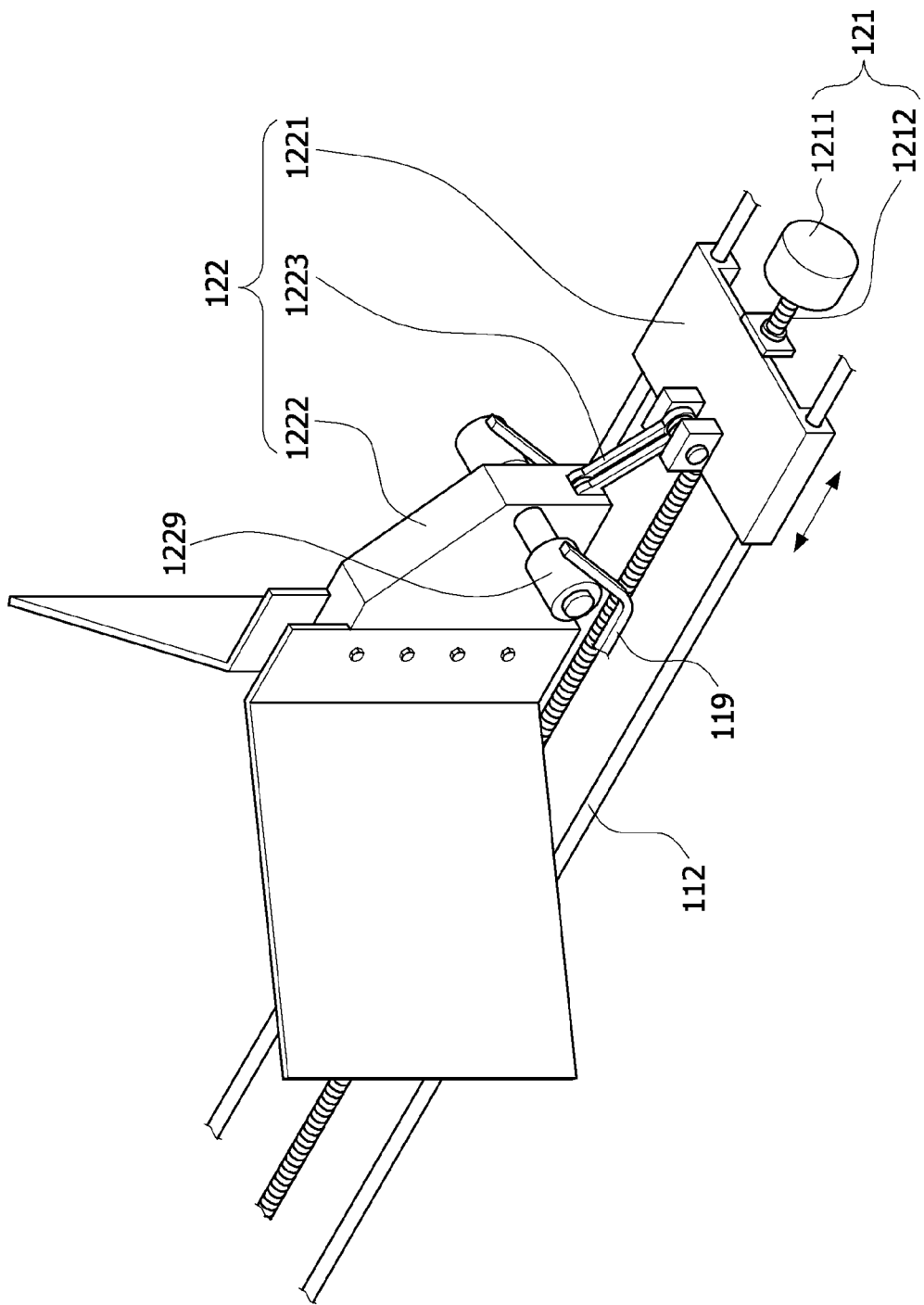
FIG. 5 is a view schematically illustrating a supply replenishment unit according to an embodiment of the present invention.
Figure 6:
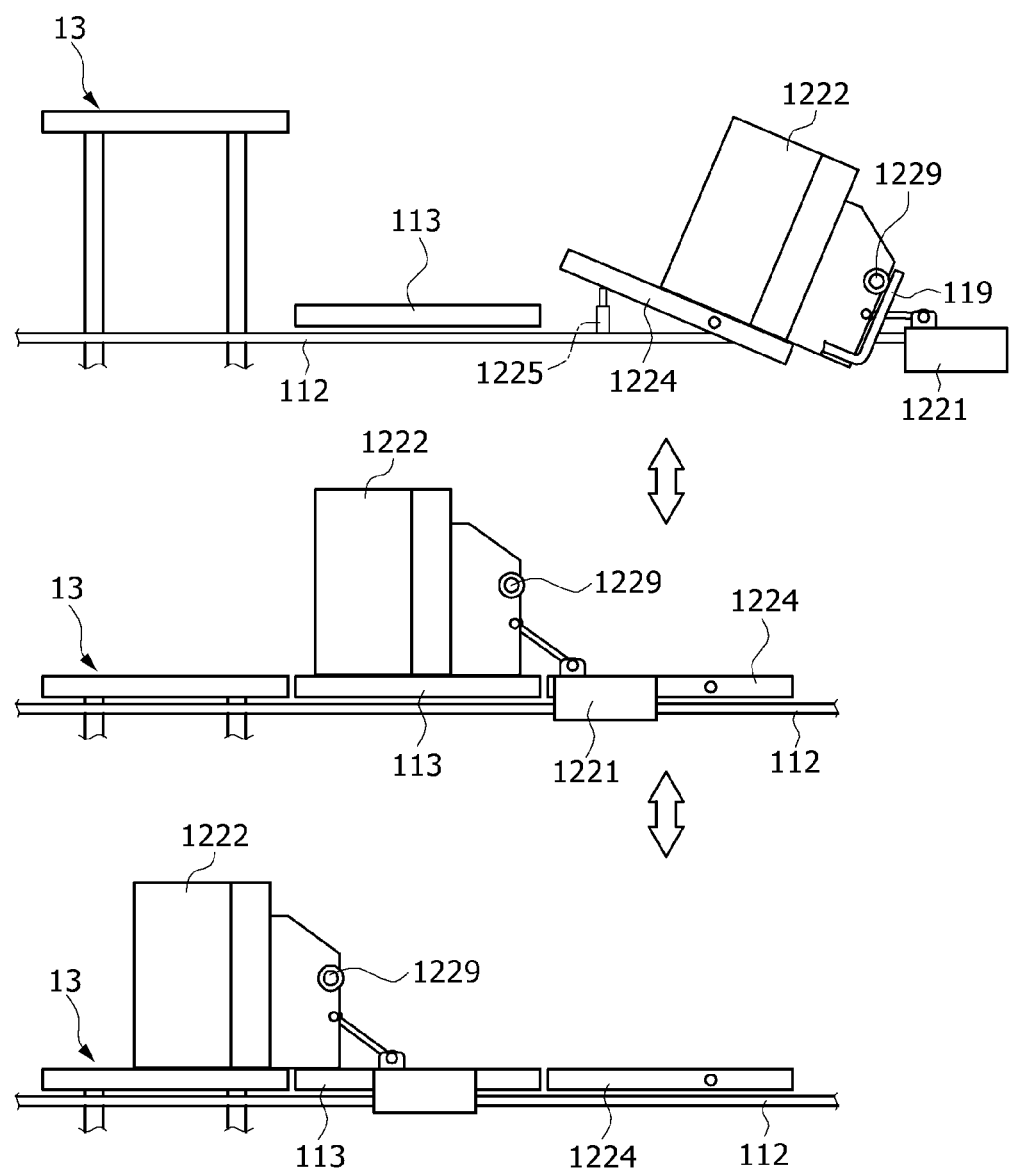
FIG. 6 is a view schematically illustrating an operation state of the supply replenishment unit according to an embodiment of the present invention.

FIG. 5 is a view schematically illustrating a supply replenishment unit according to an embodiment of the present invention, and FIG. 6 is a view schematically illustrating an operation state of the supply replenishment unit according to the embodiment of the present invention. Referring to FIGS. 5 and 6, the supply replenishment unit 12 according to the embodiment of the present invention includes a replenishment driving part 121 and a replenishment guide part 122.

The replenishment driving part 121 is mounted on the supply guide unit 11 and is driven to provide power when power is applied. In more detail, the replenishment driving part 121 may include a driving motor portion 1211 and a driving shaft portion 1212.

The driving motor portion 1211 is mounted on the supply guide unit 11. As an example, the driving motor portion 1211 may be mounted at a center of an end of the guide duct part 111 and may rotate the driving shaft portion 1212 in one direction or the other direction when power is applied.

The driving shaft portion 1212 is disposed in a lengthwise direction of the supply guide unit 11 and is rotated while being connected to the driving motor portion 1211. As an example, one end of the driving shaft portion 1212 may be rotatably mounted on the guide duct part 111, and the other end thereof may be connected to the driving motor portion 1211. The driving shaft portion 1212 may have a screw thread formed on an outer circumferential surface thereof.

The replenishment guide part 122 may reciprocate in the lengthwise direction of the supply guide unit 11 by the replenishment driving part 121 and guides the rice paper 100 to the supply standby unit 13. In more detail, the replenishment guide part 122 may include a guide movement portion 1221, a guide support portion 1222, and a guide connection portion 1223.

The guide movement portion 1221 is guided by the supply guide unit 11 and reciprocates by the replenishment driving part 121. As an example, the guide movement portion 1221 may be moved while both ends thereof pass through the guide rod part 112 and a center of the guide movement portion 1221 may be screw-coupled to the driving shaft portion 1212. Accordingly, the guide movement portion 1221 may move forward or rearward according to a rotational direction of the driving shaft portion 1212.

The guide support portion 1222 supports the stacked rice papers 100. As an example, the guide support portion 1222 is formed to have a vertical length and thus may prevent the stacked rice papers 100 from collapsing. The guide support portion 1222 may have a shape open toward the supply standby unit 13.

The guide connection portion 1223 connects the guide movement portion 1221 and the guide support portion 1222 to interlock the guide movement portion 1221 and the guide support portion 1222. As an example, both ends of the guide connection portion 1223 may be rotatably mounted on the guide movement portion 1221 and the guide support portion 1222, and the guide connection portion 1223 may transmit power of the guide movement portion 1221 to the guide support portion 1222.

The replenishment guide part 122 according to the embodiment of the present invention may further include a guide pedestal portion 1224 and a guide rotation portion 1225.

The guide pedestal portion 1224 is rotatably mounted on the supply guide unit 11 and supports the rice paper 100. As an example, the guide pedestal portion 1224 may be disposed in succession with the guide rail part 113 and support a lower side of the guide support portion 1222.

The guide rotation portion 1225 rotates the guide pedestal portion 1224 to induce inclined input of the rice paper 100. As an example, the guide rotation portion 1225 may be rotated as the length of a cylinder mounted on a bottom surface of the guide rotation portion 1225 is changed or a rotating body coupled to a rotary shaft of the guide rotation portion 1225 is driven. In addition, various components for self-rotating the guide pedestal portion 1224 may be adopted as the guide rotation portion 1225.

Meanwhile, both sides of the guide support portion 1222 may be horizontally moved along a groove formed in the guide duct part 111, and when the guide support portion 1222 is disposed above the guide pedestal portion 1224, the horizontal movement may be limited, and both sides of the guide support portion 1222 may be rotatably supported by the guide duct part 111. As a result, when the guide pedestal portion 1224 is rotated, the guide support portion 1222 is also rotated, and thus the inclined input of the rice paper 100 can be performed.

In this case, as a guide locking portion 1229 formed in the guide support portion 1222 is caught by a guide boss part 119 formed in the guide duct part 111, rotation of the guide locking portion 1229 is restricted and a rotational angle may be maintained. Further, when the guide pedestal portion 1224 is rotated, the guide movement portion 1221 may be moved to pull the guide support portion 1222.

In addition, the guide rotation portion 1225 may be removed. That is, the guide pedestal portion 1224 may be rotatably mounted on the guide duct part 111, and when the guide support portion 1222 is caught by the guide pedestal portion 1224 while moving in a direction toward the driving motor portion 1211, a state in which the guide support portion 1222 and the guide pedestal portion 1224 are connected to each other may be maintained. In the above state, when the guide movement portion 1221 is moved by additionally driving the driving motor portion 1211, the guide support portion 1222 and the guide pedestal portion 1224 connected to the guide support portion 1222 may be rotated to induce the inclined input. Further, when the driving motor portion 1211 is driven after the rice paper 100 is input, the guide support portion 1222 may be moved in a direction toward the supply standby unit 13, the guide pedestal portion 1224 may be connected to the guide rail part 113 while rotating, and the guide support portion 1222 may move the rice paper 100 while moving along the guide rail part 113.

Figure 7:
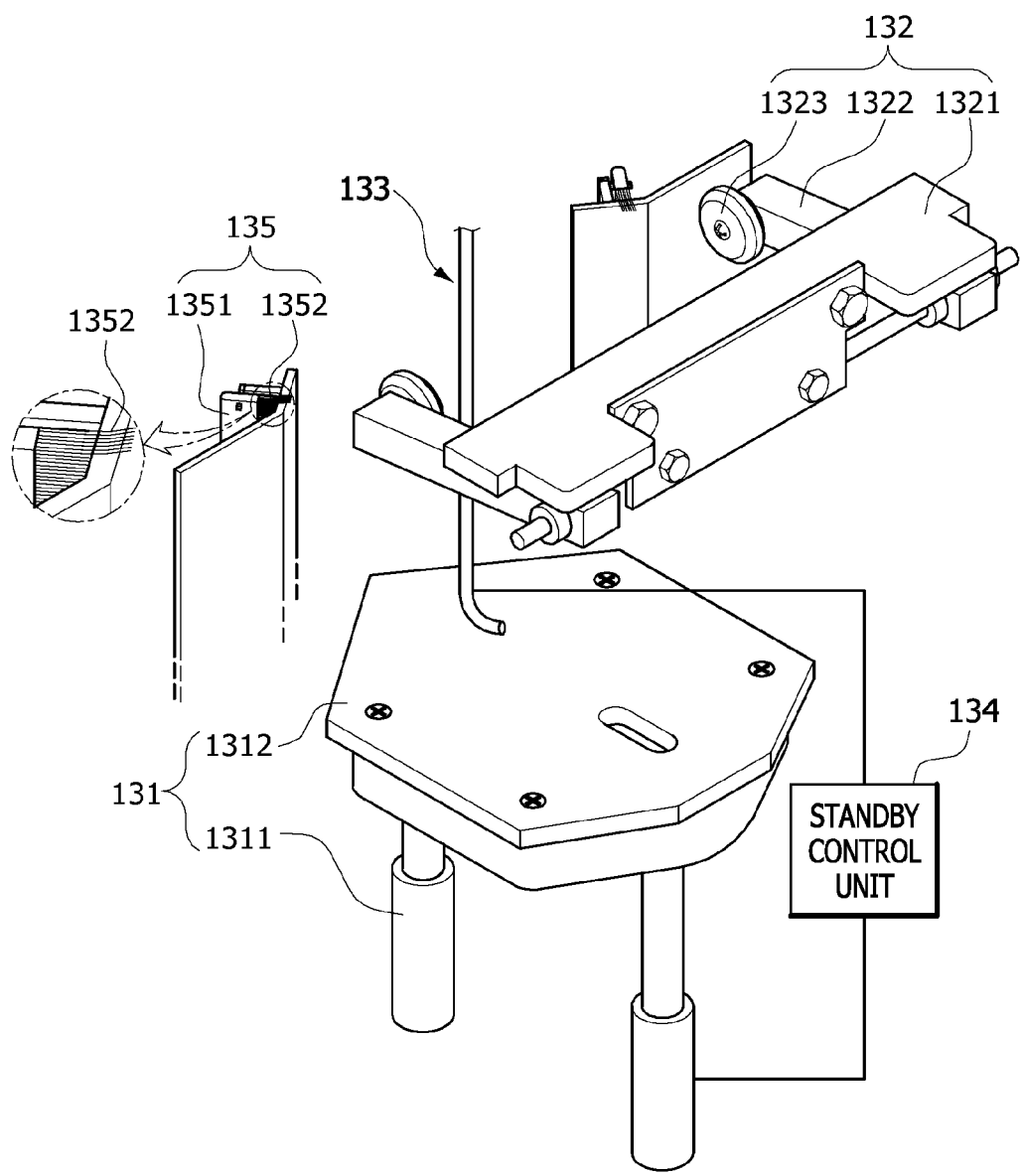
FIG. 7 is a view schematically illustrating a supply standby unit according to an embodiment of the present invention.

FIG. 7 is a view schematically illustrating a supply standby unit according to an embodiment of the present invention. Referring to FIG. 7, the supply standby unit 13 according to the embodiment of the present invention includes a standby elevation part 131 and a standby support part 132.

The standby elevation part 131 is mounted on the supply guide unit 11 to vertically move and moves the rice paper 100 horizontally moved through the supply replenishment unit 12 upward. As an example, the standby elevation part 131 may include a first standby elevation portion 1311 which is mounted on the guide duct part 111 and of which the length is varied by hydraulic pressure or pneumatic pressure and a second standby elevation portion 1312 which is formed at an upper end of the first standby elevation portion 1311, of which the height is adjusted, and which is disposed in succession with the guide rail part 113.

The standby support part is mounted on the supply guide unit 11 and supports the uppermost end of the rice paper 100 moved upward. As an example, the standby support part 132 may include a first standby support portion 1321 coupled to the guide duct part 111 and disposed above the standby elevation part 131, a second standby support portion 1322 protruding downward from the first standby support portion 1321, and a third standby support portion 1323 that is rotatably mounted on the second standby support portion 1322 and is in contact with the rice paper 100.

The supply standby unit 13 according to the embodiment of the present invention may further include a standby sensor part 133 and a standby control unit 134.

The standby sensor part 133 is mounted on the supply guide unit 11 and measures the height of the rice paper 100. As an example, the standby sensor part 133 may be in contact with the uppermost rice paper of the rice papers 100 and may measure the height of the stacked rice papers 100 while the rice papers 100 move downward due to its own weight when the uppermost rice paper of the rice papers 100 moves to the supply transfer unit 14.

The standby control unit 134 receives a detection signal of the standby sensor part 133 to operate the standby elevation part 131. As an example, when the standby sensor part 133 is lowered to a preference point or lower, the standby elevation part 131 may elevate the rice paper 100 under control of the standby control unit 134.

The supply standby unit 13 according to the embodiment of the present invention may further include a standby separation part 135. The standby separation part 135 is mounted on the supply guide unit 11 and induces individual separation of the rice papers 100. As an example, the standby separation part 135 may include a first standby separation portion 1351 mounted on an upper end of the guide duct part 111 and a second standby separation portion 1352 by which the plurality of rice papers 100 protruding in a vertical length direction of the first standby separation portion 1351 and moved to the supply transfer unit 14 is caught. The standby separation part 135 may be made of an elastic material and prevent the plurality of rice papers 100 from being attached and discharged.

Figure 8:
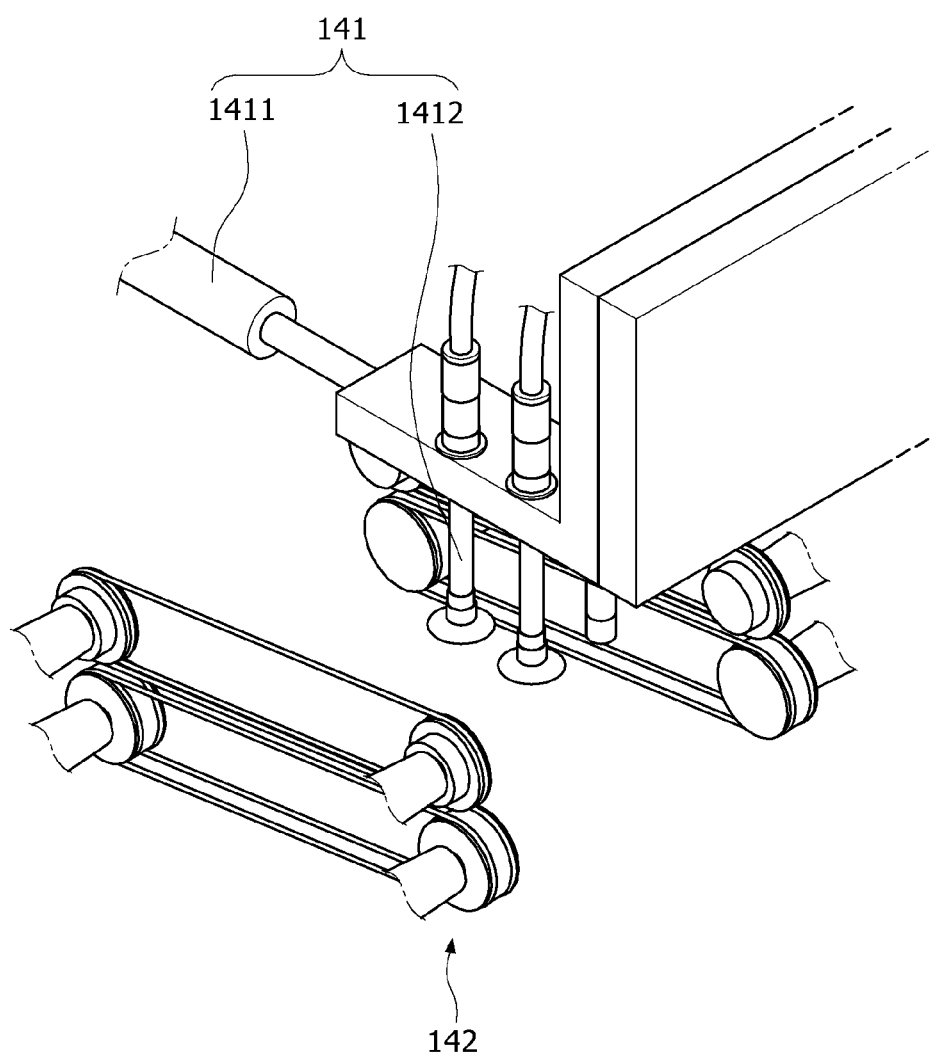
FIG. 8 is a view schematically illustrating a supply transfer unit according to an embodiment of the present invention.

FIG. 8 is a view schematically illustrating a supply transfer unit according to an embodiment of the present invention. Referring to FIG. 8, the supply transfer unit 14 according to the embodiment of the present invention includes a transfer adsorption part 141 and a transfer belt part 142.

The transfer adsorption part 141 adsorbs the uppermost rice paper of the stacked rice papers 100. As an example, the transfer adsorption part 141 may include a first transfer adsorption portion 1411 which is supported by the guide duct part 111 and of which the length is increased or decreased and a second transfer adsorption portion 1412 that is formed in the first transfer adsorption portion 1411, protrudes downward, and adsorbs the uppermost rice paper of the stacked rice papers 100. In this case, the second transfer adsorption portion 1412 may be vertically moved as needed.

The transfer belt part 142 moves the rice paper 100 supplied through the transfer adsorption part 141. As an example, the transfer belt parts 142 may be vertically arranged on both sides of the first transfer adsorption portion 1411 and may be moved in a caterpillar manner in opposite directions to move the input rice paper 100 in one direction.

Figure 9:
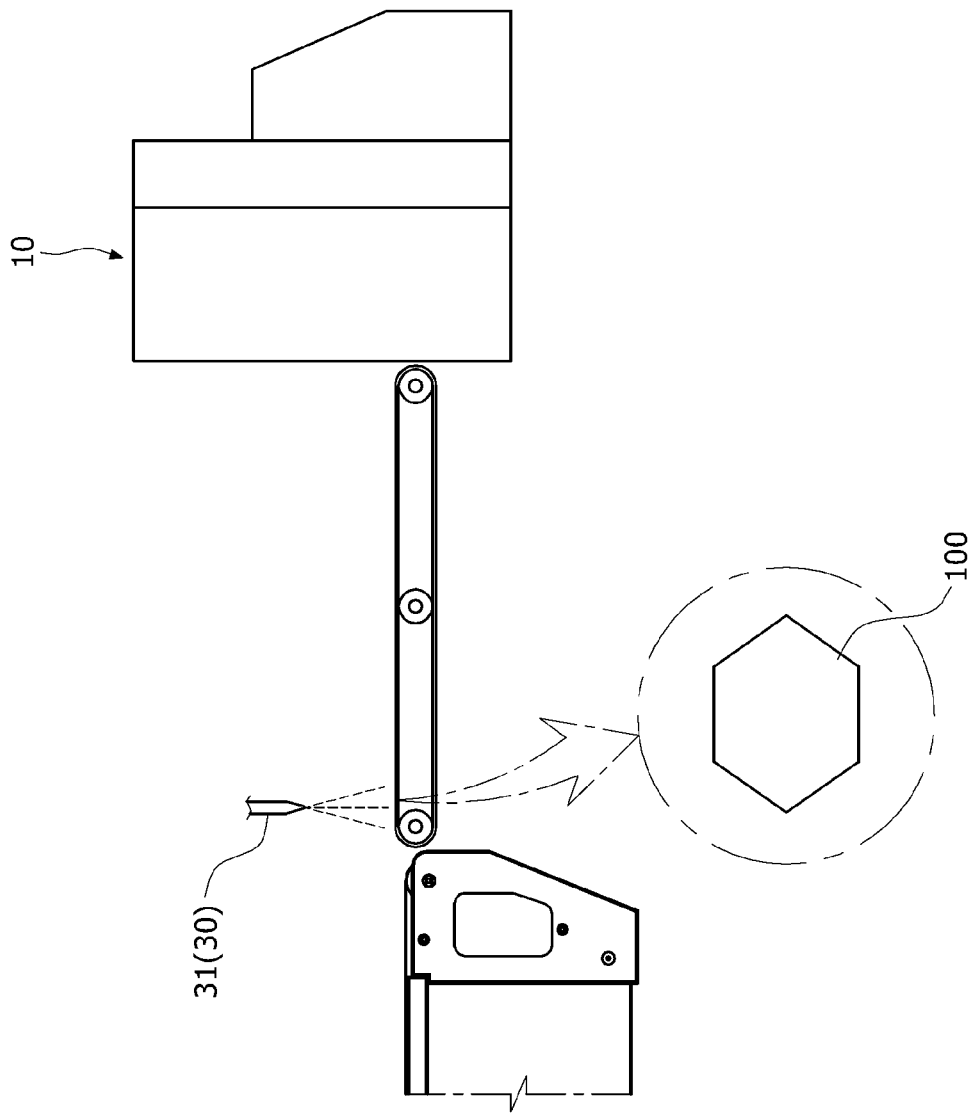
FIG. 9 is a view schematically illustrating a softening unit according to an embodiment of the present invention.

FIG. 9 is a view schematically illustrating a softening unit according to an embodiment of the present invention. Referring to FIG. 9, the softening unit 30 according to the embodiment of the present invention includes a softening spraying unit 31. The softening spraying unit 31 sprays hot water onto the rice paper 100 moved by the supply unit 10. As an example, the softening spraying unit 31 may be disposed above or below the transfer belt part 142 and spray hot water onto the moved rice paper 100. In addition, the softening spraying unit 31 may spray hot water onto the rice paper 100 moved by the movement unit 20.

Figure 10:
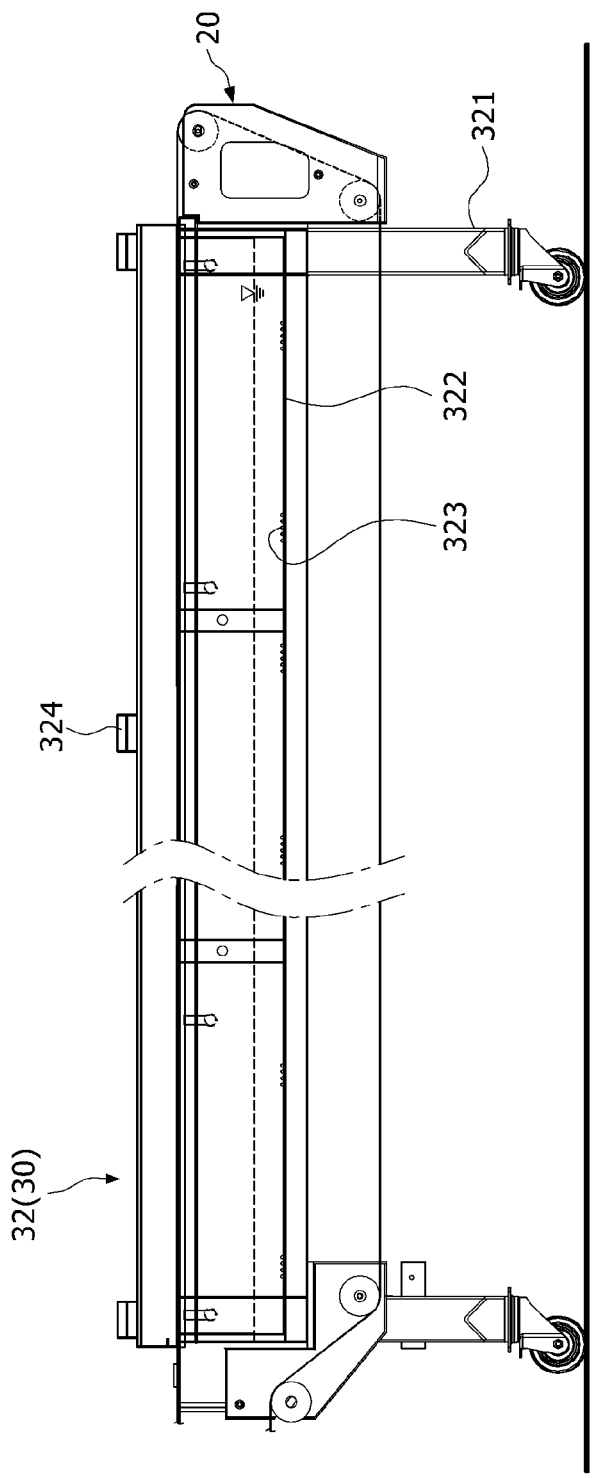
FIG. 10 is a view schematically illustrating a softening steam unit according to an embodiment of the present invention.

FIG. 10 is a view schematically illustrating a softening steam unit according to an embodiment of the present invention. Referring to FIG. 10, the softening unit 30 according to the embodiment of the present invention may further include a softening steam unit 32 that supplies steam to the rice paper 100. That is, moisture is primarily supplied to the upper surface or lower surface of the rice paper 100 by the softening spraying unit 31, moisture is supplied to the front surface of the rice paper 100 through steam, and thus the rice paper 100 can be rapidly softened.

The softening steam unit 32 according to the embodiment of the present invention includes a steam stand part 321, a steam water tank part 322, and a steam heating part 323. The softening steam unit 32 may cover a portion of the movement unit 20 and supply steam to the rice paper 100 moved by the movement unit 20.

A plurality of steam stand parts 321 support the steam water tank part 322 in which water is stored. As an example, four steam stand parts 321 may be fixed to the ground, and separate wheels may be driven so that the steam stand parts 321 move to its destination.

The steam water tank part 322 covers the movement unit 20. As an example, a belt conveyor of the movement unit 20 may pass through an inside of the steam water tank part 322, and water may be stored below a belt of the movement unit 20.

The steam heating part 323 is mounted on the steam water tank part 322 and heats the stored water. As an example, the steam heating part 323 may be a coil that heats the water when power is applied. The steam heating part 323 may be provided as a plurality of steam heating parts 323 arranged in a lengthwise direction of the steam water tank part 322.

The softening steam unit 32 according to the embodiment of the present invention may further include a steam circulation part 324. The steam circulation part 324 is mounted on the steam water tank part 322 and circulates the steam. As an example, the steam circulation part 324 may be mounted on the steam water tank part 322 and induce circulation of the steam when a wing is rotated. The steam circulation part 324 may be provided as a plurality of steam circulation parts 324 mounted in the lengthwise direction of the steam water tank part 322.

Figure 11:
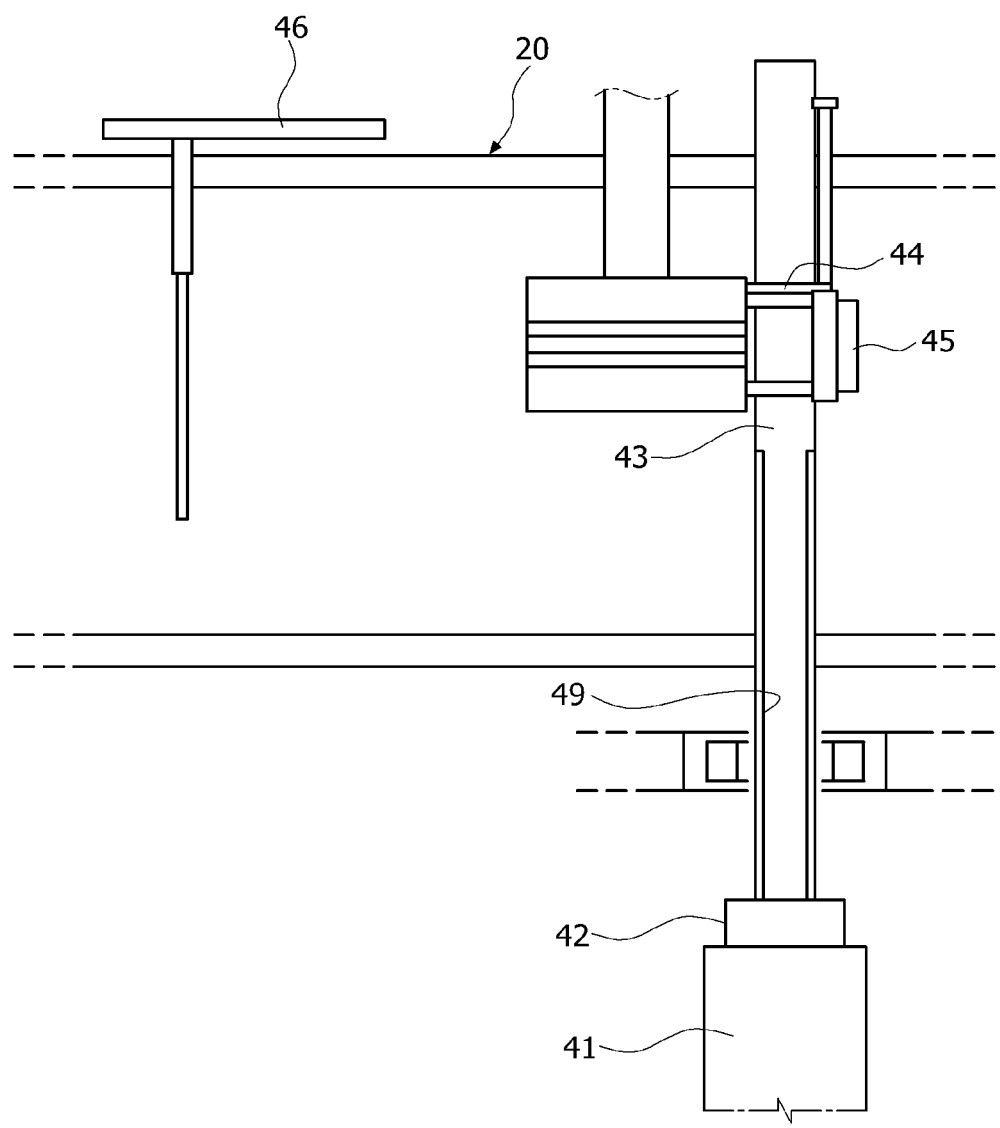
FIG. 11 is a view schematically illustrating an input unit according to an embodiment of the present invention.

FIG. 11 is a view schematically illustrating an input unit according to an embodiment of the present invention. Referring to FIG. 11, the input unit 40 according to the embodiment of the present invention includes an input provision unit 41 and an input cutting unit 42 and performs cutting to subdivide the stuffing 200. In addition, the input unit 40 further includes an input belt unit 43, an input stopper unit 44, and an input dropping unit 45 and sequentially drops the subdivided stuffing 200 onto the moved rice paper 100.

The input provision unit 41 provides the stuffing 200, the input cutting unit 42 cuts the stuffing 200 discharged from the input provision unit 4, the input belt unit 43 guides the cut and subdivided stuffing 200, the input stopper unit 44 temporarily stops the stuffing 200 moved by the input belt unit 43, and the input dropping unit 45 drops, from the input belt unit 43, the stuffing 200 of which movement is stopped by the input stopper unit 44. In this case, an input guide unit 49 mounted on the movement unit 20 and configured to guide the stuffing 200 may be formed above the input belt unit 43.

Figure 12:
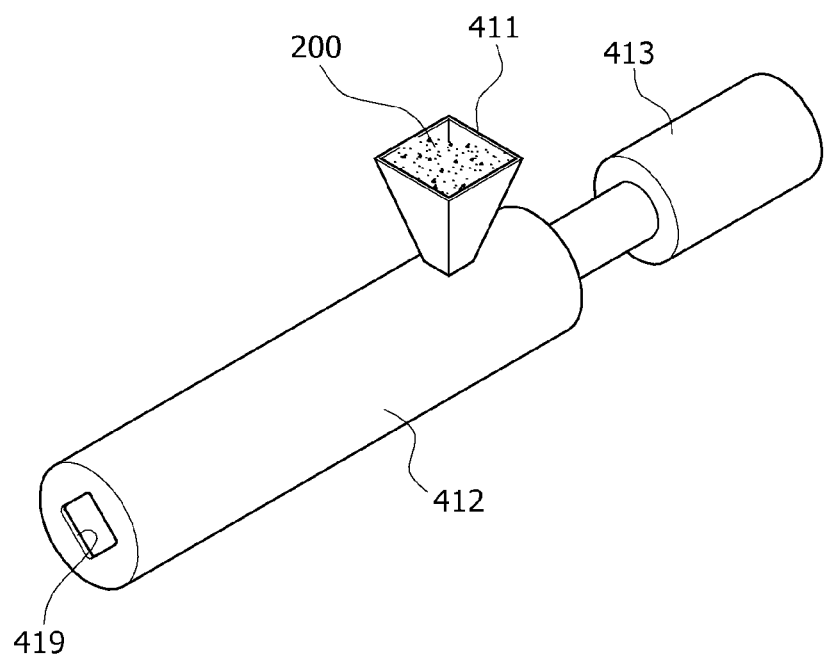
FIG. 12 is a view schematically illustrating an input provision unit according to an embodiment of the present invention.

FIG. 12 is a view schematically illustrating an input provision unit according to an embodiment of the present invention. Referring to FIG. 12, the input provision unit 41 according to the embodiment of the present invention includes a provision injection part 411, a provision guide part 412, and a provision operation part 413.

The stuffing 200 introduced into the provision injection part 411 is guided by the provision guide part 412, and the provision operation part 413 discharges the stuffing 200 stored in the provision guide part 412 to an end of the provision guide part 412.

As an example, the provision injection part 411 may have a hopper shape communicating with one end of the provision guide part 412, and the operator inputs the stuffing 200 to the provision injection part 411. Further, the provision guide part 412 may have a cylindrical shape, and the provision operation part 413 may be inserted into the provision guide part 412 to move the stuffing 200. In this case, the provision operation part 413 may move the stuffing 200 in one direction when a spiral rod rotates or may move the stuffing 200 by a change in the length of a piston.

A guide hole part 419 formed in an end of the provision guide part 412 has a faceted shape, and the stuffing 200 is discharged to the faceted shape. That is, in order to suppress rotation of the stuffing 200 dropped onto the rice paper 100, the stuffing 200 may pass through the guide hole part 419 having a faceted shape. In this case, the guide hole part 419 may have a triangular or quadrangular hole shape.

Figure 13:
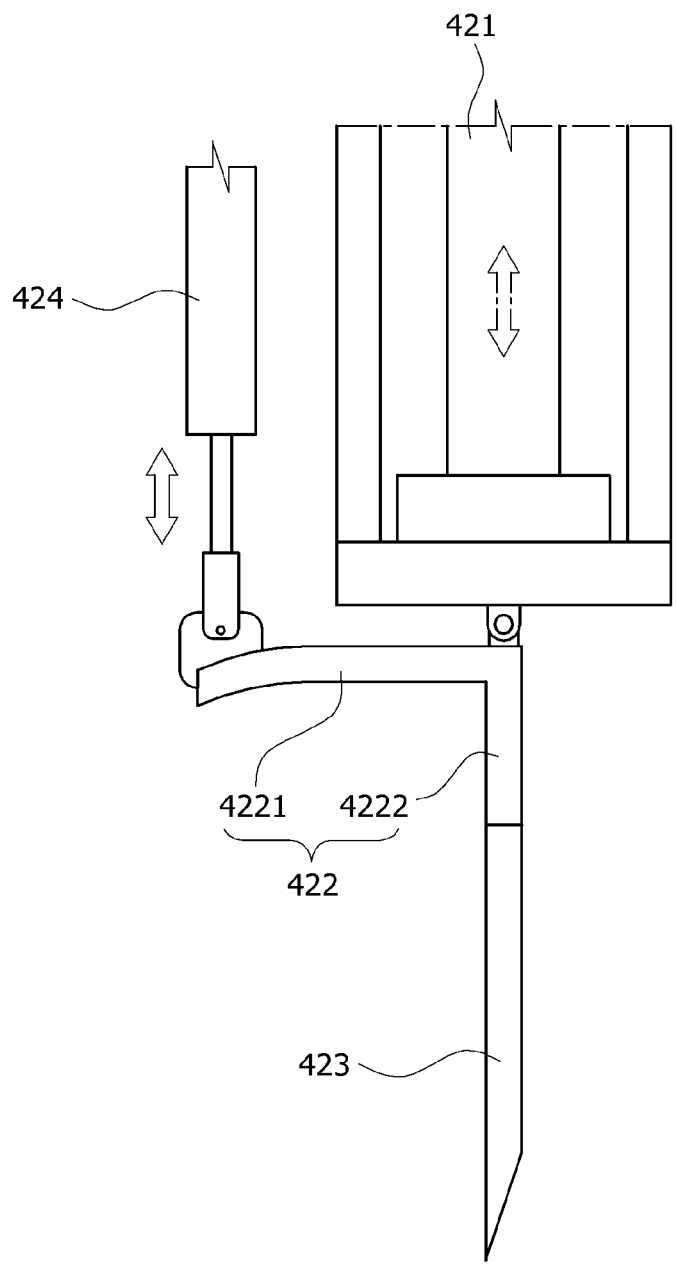
FIG. 13 is a view schematically illustrating an input cutting unit according to an embodiment of the present invention.
Figure 14:
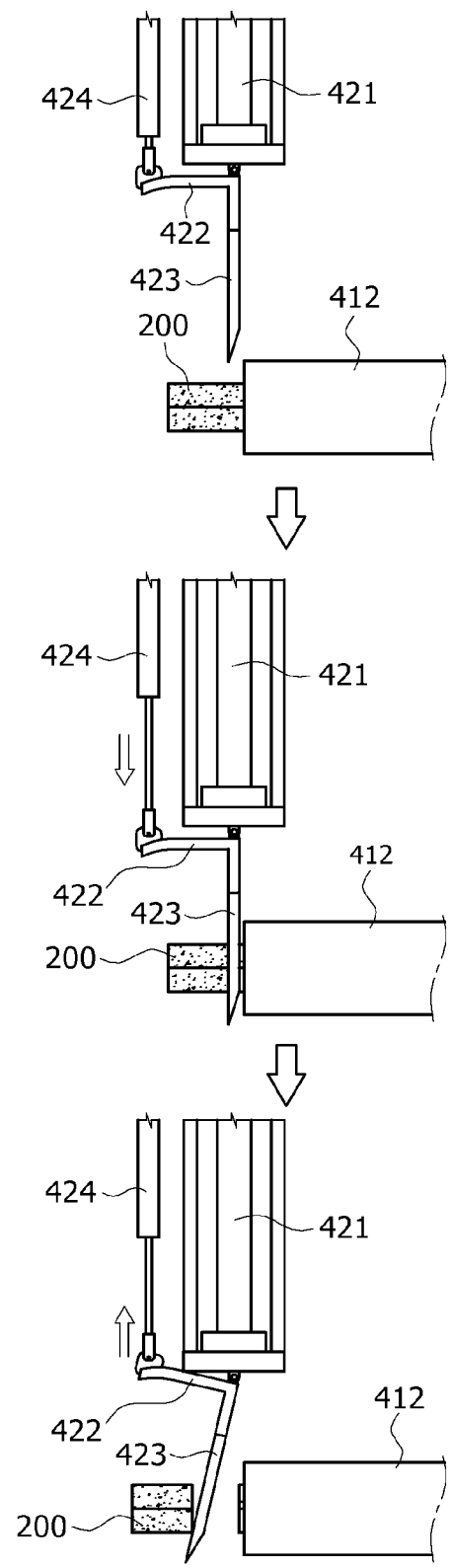
FIG. 14 is a view schematically illustrating an operation state of the input cutting unit according to an embodiment of the present invention.

FIG. 13 is a view schematically illustrating an input cutting unit according to an embodiment of the present invention, and FIG. 14 is a view schematically illustrating an operation state of the input cutting unit according to the embodiment of the present invention. Referring to FIGS. 13 and 14, the input cutting unit 42 according to the embodiment of the present invention includes a cutting driving part 421, a cutting link part 422, a cutting blade part 423, and a cutting rotation part 424.

A vertical length of the cutting driving part 421 is varied. As an example, the cutting driving part 421 may be fixedly installed in the provision guide part 412 or a separate fixture and have a length that is adjusted as the piston is vertically moved by hydraulic pressure or pneumatic pressure.

The cutting link part 422 is rotatably mounted on the cutting driving part 421 and has a height that is adjusted according to the length of the cutting driving part 421. As an example, the cutting link part 422 may include a horizontal link portion 4221 which has a horizontal length and is rotatably mounted on the cutting driving part 421 and of which the length is adjustable and a vertical link portion 4222 extending downward from one end of the horizontal link portion 4221.

The cutting blade part 423 is formed in the cutting link part 422 and cuts the stuffing 200. As an example, the cutting blade part 423 may have a plate shape covering the guide hole part 419 and may be mounted on the vertical link portion 4222.

The cutting rotation part 424 is connected to the cutting link part 422 and varies a length thereof to rotate the cutting link part 422. As an example, the cutting rotation part 424 may be mounted in the provision guide part 412 or a separate fixture and have a length that is adjusted when the piston is vertically moved by hydraulic pressure or pneumatic pressure. The cutting rotation part 424 may be connected to the other end of the horizontal link portion 4221.

Thus, when the stuffing 200 is discharged from the input provision unit 41, the length of the cutting driving part 421 is increased, and thus the cutting link part 422 is moved downward. When the cutting link part 422 is moved downward, the cutting blade part 423 cuts the stuffing 200 that is continuously discharged. In this case, the length of the cutting rotation part 424 is increased in the same manner as the cutting driving part 421, and thus the cutting link part 422 may be moved downward in a straight line.

Meanwhile, when the cutting blade part 423 cuts the stuffing 200, the length of the cutting rotation part 424 is decreased. Accordingly, while the other end of the cutting link part 422 is raised, one end of the cutting link part 422 is rotated. Further, the cutting blade part 423 mounted on the cutting link part 422 may move to take out the cut stuffing 200 and thus may additionally cut or separate a tendon and the like contained in the stuffing 200.

Figure 15:
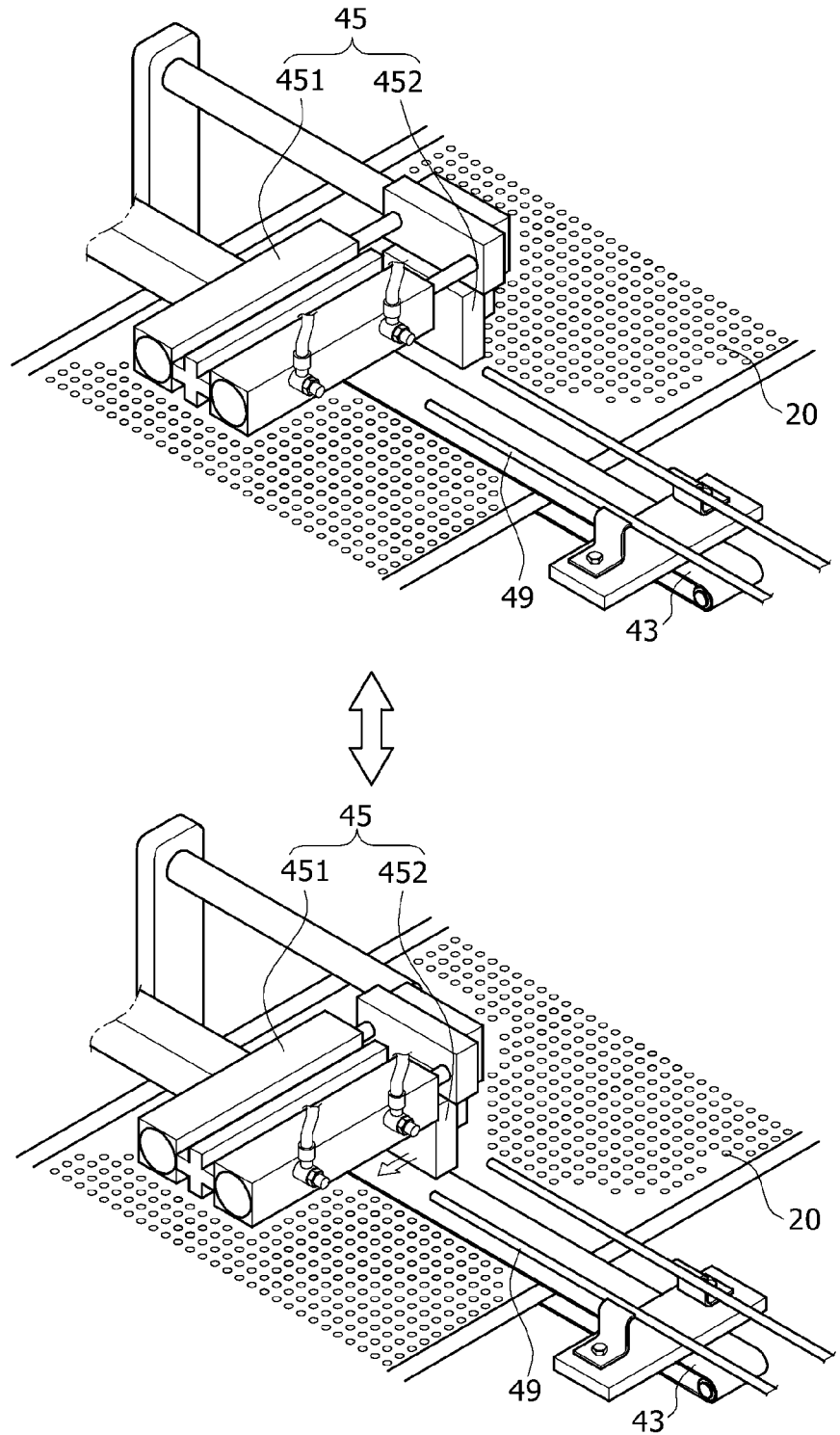
FIG. 15 is a view schematically illustrating an input dropping unit according to an embodiment of the present invention.

FIG. 15 is a view schematically illustrating an input dropping unit according to an embodiment of the present invention. Referring to FIG. 15, the input dropping unit 45 according to the embodiment of the present invention includes a dropping operation part 451 and a dropping plate part 452.

The dropping operation part 451 is disposed above the input belt unit 43 and has a variable length. As an example, the length of the dropping operation part 341 may be increased or decreased as the piston is operated and may be disposed to intersect the input belt unit 43.

The dropping plate part 452 is mounted on the dropping operation part 451, protrudes downward, and pushes the stopped stuffing 200 to the input belt unit 43 by the input stopper unit 44 while being linearly moved by the dropping operation part 451. Accordingly, the stuffing 200 dropped from the input belt unit 43 may be seated on the rice paper 100 moved by the movement unit 20.

A process of dropping the stuffing 200 will be schematically described as follows with reference to the above configuration. First, the subdivided stuffing 200 is dropped onto the input belt unit 43, is moved in a lengthwise direction of the input belt unit 43, and reaches the input stopper unit 44, and the movement of the stuffing 200 is then restricted. Further, when the length of the dropping operation part 451 decreases, the dropping plate part 452 pushes the stuffing 200 seated on the input belt unit 43 and drops the stuffing 200 onto the rice paper 100 moved through the movement unit 20 disposed below the input belt unit 43. In this case, various sensors detect a location of the rice paper 100, and thus the stuffing 200 may be stably dropped onto the rice paper 100.

Figure 16:
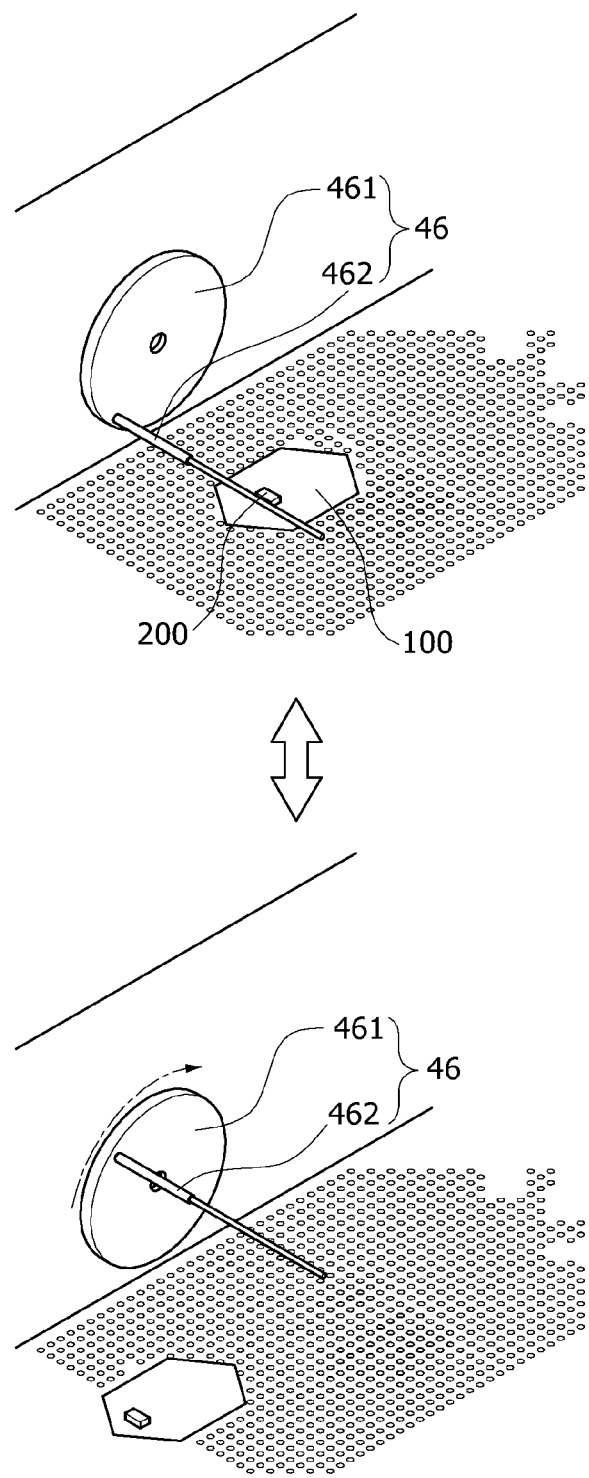
FIG. 16 is a view schematically illustrating an input alignment unit according to an embodiment of the present invention.

FIG. 16 is a view schematically illustrating an input alignment unit according to an embodiment of the present invention. Referring to FIG. 16, the input unit 40 according to the embodiment of the present invention may further include an input alignment unit 46. The input alignment unit 46 aligns the stuffing 200 dropped onto the rice paper 100.

In more detail, the input alignment unit 46 includes an alignment rotation part 461 and an alignment rod part 462. The alignment rotation part 461 is rotatably mounted on the movement unit 20, and the alignment rod part 462 protrudes from the alignment rotation part 461 and aligns the stuffing 200 while in contact with the stuffing 200 dropped onto the rice paper 100. As an example, when the stuffing 200 seated on the rice paper 100 is not disposed at a correct location while the stuffing 200 is dropped by the movement unit 20, the stuffing 200 may be caught by the alignment rod part 462 and thus aligned at the correct location. In this case, when the alignment rod part 462 aligns the stuffing 200 at the correct location, the alignment rotation part 461 may rotate the alignment rod part 462 to prevent interference with the stuffing 200 and thereafter may stand by to align the stuffing 200 seated on the rice paper 100. Meanwhile, various sensors detect locations of the rice paper 100 and the stuffing 200, and thus an operation of the alignment rotation part 461 can be automatically controlled.

Figure 17:
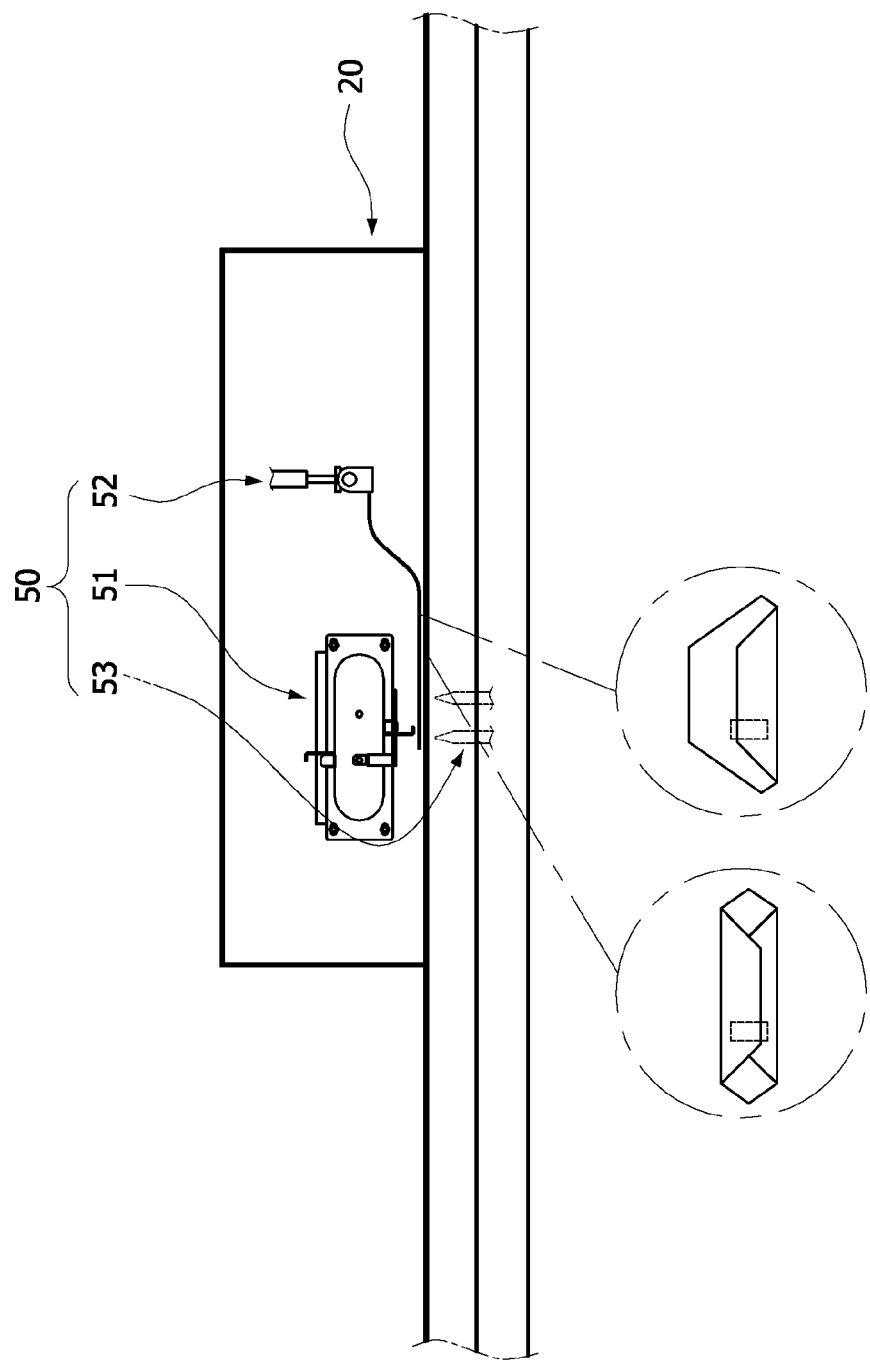
FIG. 17 is a view schematically illustrating a folder unit according to an embodiment of the present invention.

FIG. 17 is a view schematically illustrating a folder unit according to an embodiment of the present invention. Referring to FIG. 17, the folder unit 50 according to the embodiment of the present invention includes a folder support unit 51, a folder pressing unit 52, and a folder spraying unit 53.

The folder support unit 51 supports the stuffing 200. As an example, the folder support part 51 may temporarily press the stuffing 200 seated on the rice paper 100 moved through the movement unit 20 or the rice paper 100 partially surrounding the stuffing 200 so as to prevent lateral movement of the stuffing 200 or the rice paper 100 during a folding operation.

The folder pressing unit 52 presses a left wing and a right wing of the rice paper 100. As an example, the folder pressing unit 52 may press the left wing and the right wing of the rice paper 100, arranged on both sides of the stuffing 200, to provide a reference line on which the rice paper 100 is folded during a subsequent folding operation.

The folder spraying unit 53 sprays air onto the left wing and the right wing of the rice paper 100 to induce folding of the rice paper 100 pressed by the folder pressing unit 52. As an example, the folder spraying unit 53 may sequentially spray air onto both sides of the rice paper 100 so that the rice paper 100 disposed on both sides of the stuffing 200 may be alternately folded.

Figure 18:
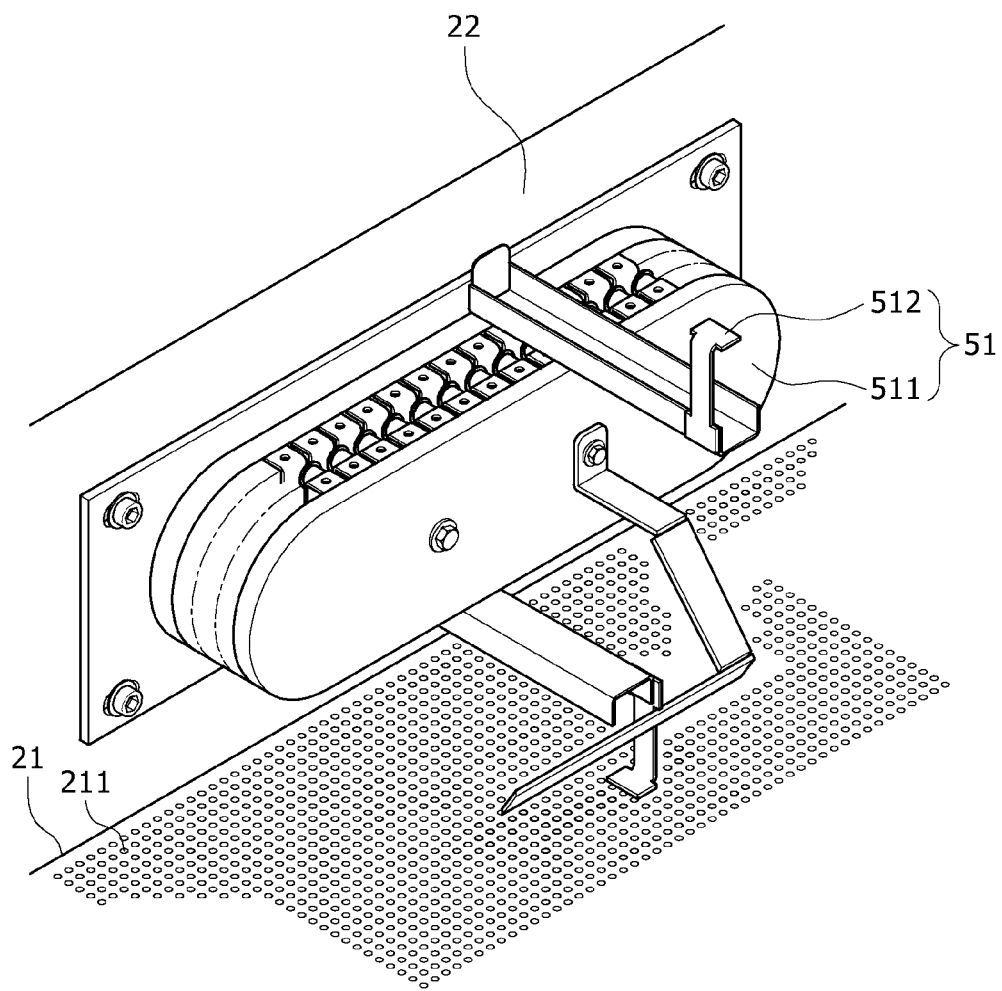
FIG. 18 is a view schematically illustrating a folder support unit according to an embodiment of the present invention.

FIG. 18 is a view schematically illustrating a folder support unit according to an embodiment of the present invention. Referring to FIG. 18, the folder support unit 51 according to the embodiment of the present invention includes a folder driving part 511 and a folder contact part 512.

The folder driving part 511 is disposed above the moved rice paper 100 and is moved in a progress direction of the rice paper 100. Further, the folder contact part 512 is mounted on the folder driving part 511 and presses the stuffing 200 while moving in the progress direction of the rice paper 100.

As an example, the movement unit 20 may include a movement belt unit 21 that moves the rice paper 100 moved and seated in a caterpillar manner and movement fixing units 22 arranged on both sides of the movement belt unit 21. A plurality of belt hole parts 211 for spraying a gas may be formed in the movement belt unit 21. Meanwhile, the folder driving part 511 may be mounted on the movement fixing unit 22 and may be disposed above the movement belt unit 21. Further, the folder driving part 511 may move one or more folder contact parts 512 in a caterpillar manner.

Figure 19:
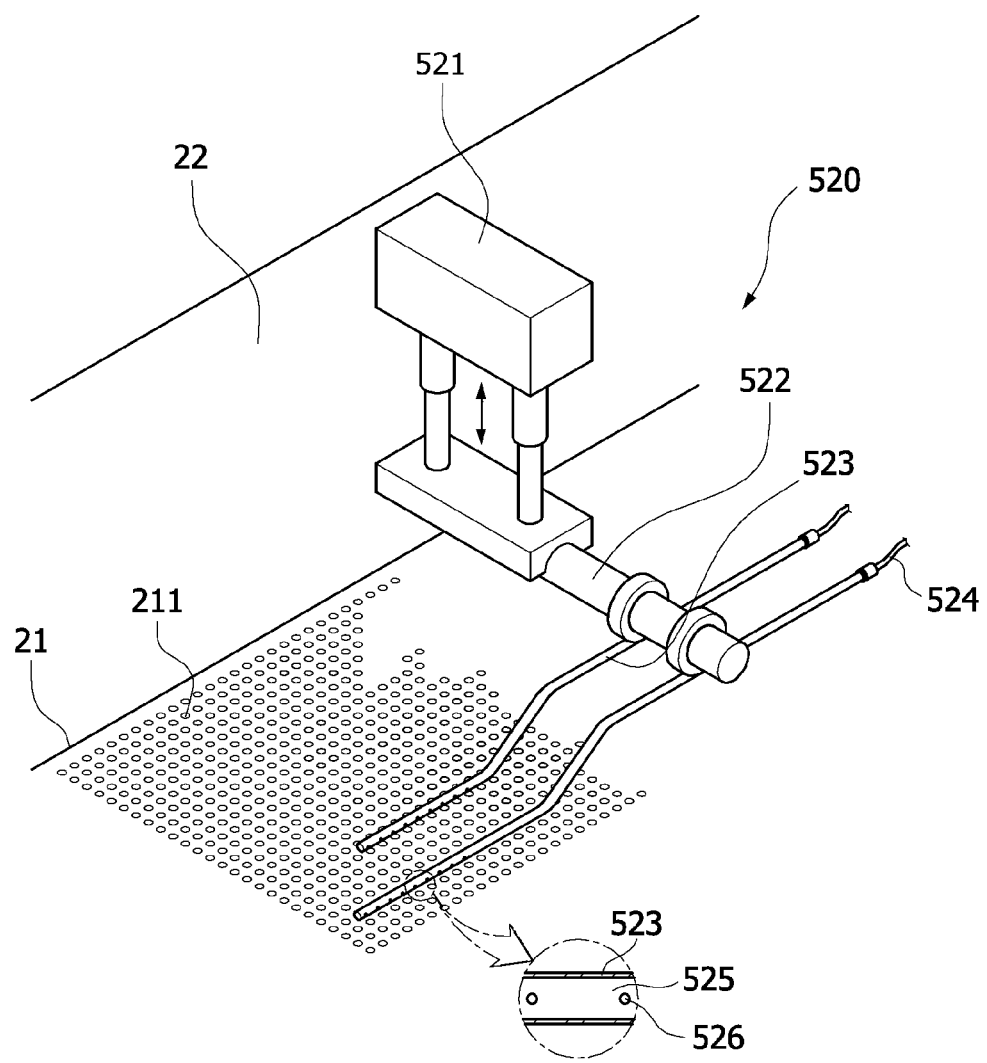
FIG. 19 is a view schematically illustrating a folder pressing unit according to an embodiment of the present invention.

FIG. 19 is a view schematically illustrating a folder pressing unit according to an embodiment of the present invention. Referring to FIG. 19, the folder pressing unit 52 according to the embodiment of the present invention includes a pressing operation part 521, a pressing rod part 522, and a pressing part 523.

The pressing operation part 521 is disposed above the moved rice paper 100 and has a variable length. The pressing rod part 522 is mounted on the pressing operation part 521 and has a height that is adjusted when the pressing operation part 521 is operated. As an example, the pressing operation part 521 may be mounted on the movement fixing unit 22 and adjust the height of the pressing rod part 522 when the length of the piston is varied by hydraulic pressure or pneumatic pressure. The pressing rod part 522 may be disposed perpendicular to a progress direction of the movement belt unit 21.

The pressing part 523 is mounted on the pressing rod part 522 and presses the left and right wings of the rice paper 100. As an example, the pressing part 523 may be provided as a pair of pressing parts 523 mounted on the pressing rod part 522. In the above state, when the sensor detects the rice paper 100, the length of the pressing operation part 521 is increased, and thus the pressing rod part 522 is moved downward. Accordingly, when the pressing parts 523 press the left and right wings of the rice paper 100 moved in the movement belt unit 21, the folder spraying unit 53 may sequentially spray air onto both sides of the rice paper 100 so that the left and right wings of the rice paper 100 may be folded. In this case, one of the pair of pressing parts 532 is formed to be longer than the other thereof, and a sequential operation of the rice paper 100 can be stably performed.

The folder pressing unit 52 according to the embodiment of the present invention may further include a pressing supply part 524, a pressing guide part 525, and a pressing discharge part 536.

The pressing supply part 524 supplies a gas to the pressing part 523. As an example, the pressing supply part 524 may store a gas and may be connected to the pressing part 523 to continuously supply the gas.

The pressing guide part 525 is formed inside the pressing part 523 and guides a gas supplied through the pressing supply part 524. As an example, the pressing guide part 525 may be a passage formed in a lengthwise direction of the pressing part 523.

The pressing discharge part 526 is provided as a plurality of pressing discharge parts 526 in the lengthwise direction of the pressing part 523 and communicates with the pressing guide part 525 to discharge a gas.

When a gas is discharged to the outside through the pressing discharge part 526 in a state in which the pressing part 523 is in direct contact with the rice paper 100, it is possible to prevent the rice paper 100 from being attached to the pressing part 523.

Figure 20:
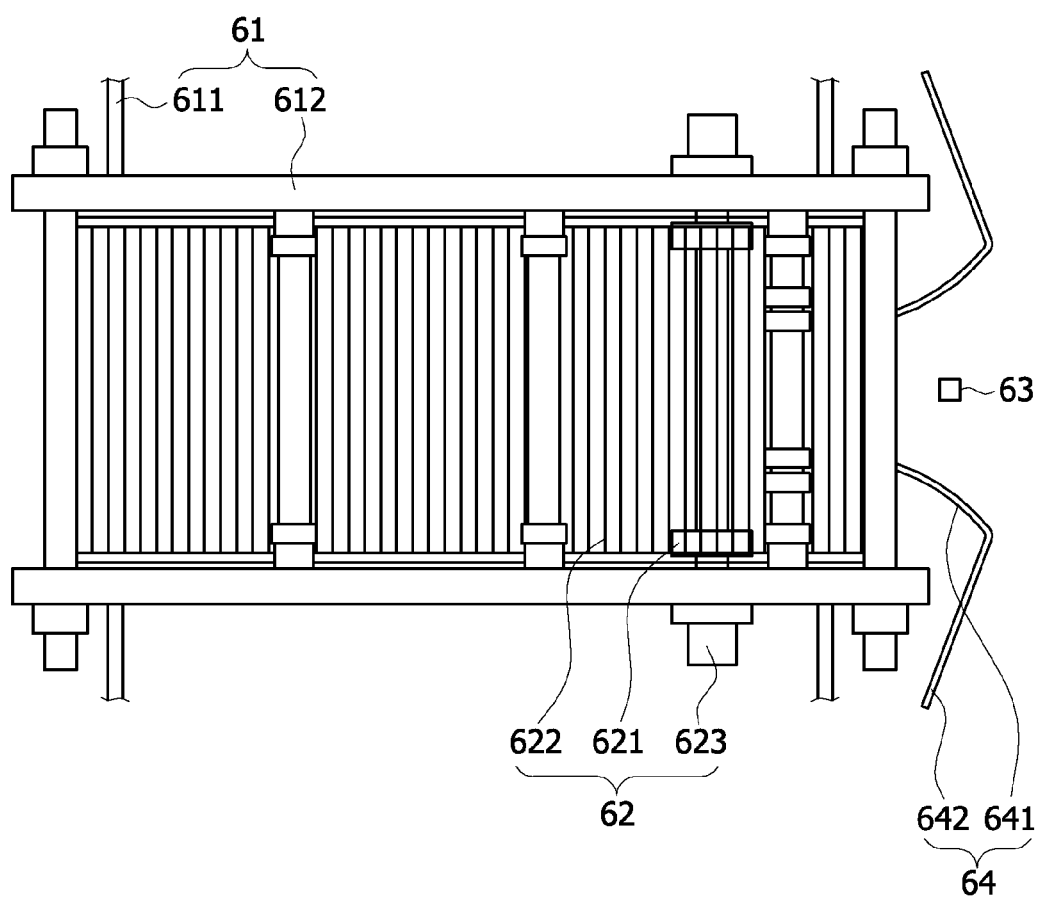
FIG. 20 is a plan view schematically illustrating a rotation unit according to an embodiment of the present invention.
Figure 21:
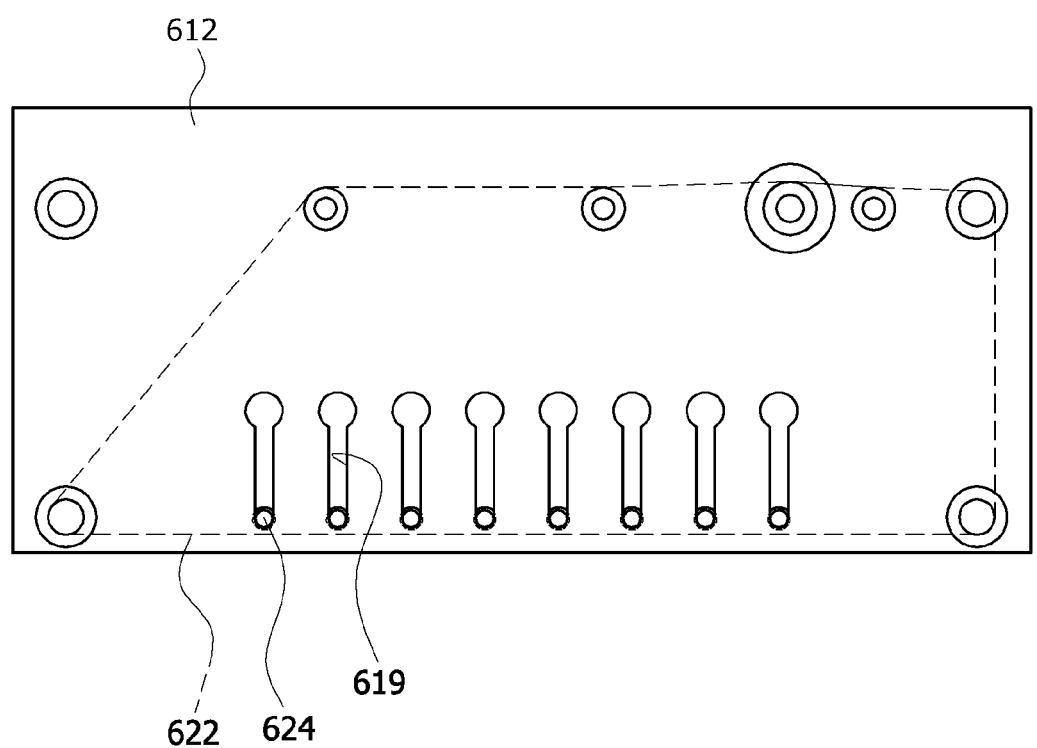
FIG. 21 is a side view schematically illustrating the rotation unit according to an embodiment of the present invention.

FIG. 20 is a plan view schematically illustrating a rotation unit according to an embodiment of the present invention, and FIG. 21 is a side view schematically illustrating the rotation unit according to the embodiment of the present invention. Referring to FIGS. 20 and 21, the rotation part 60 according to the embodiment of the present invention includes a rotation support unit 61 and a rotation chain unit 62.

The rotation support unit 61 is mounted on the movement unit 20 and disposed above the rice paper 100. As an example, the rotation support unit 61 may include one or more support fixing parts 611 that are arranged above the movement belt unit 21 and are fixedly installed in the movement fixing unit 22, and a pair of support passage parts 612 that are supported by the support fixing parts 611 are arranged to face each other and allow the rice paper 100 to pass therebetween.

The rotation chain unit 62 is mounted on the rotation support unit 61, has a length in the progress direction of the rice paper 100, and guides the moved rice paper 100 including the stuffing 200 to be caught and dried.

The rotation chain unit 62 according to the embodiment of the present invention includes a chain pulley part 621 and a chain contact part 622.

The chain pulley part 621 is rotatably mounted on the rotation chain unit 62. As an example, the chain pulley part 621 may be mounted on the support passage part 612 such that both ends thereof may rotate. The chain pulley part 621 may be arranged as a plurality of chain pulley parts 621 in a lengthwise direction of the support passage parts 612.

The chain contact part 622 may rotate in a caterpillar manner while being wound on the chain pulley part 621 and may roll the rice paper 100 moved through the movement unit 20 while in contact with the rice paper 100. That is, a space may be formed between the chain contact part 622 and the movement belt unit 21 arranged on the lower side, and the rice paper 100 moved through the movement belt unit 21 may be rotated while in contact with the chain contact part 622.

The rotation chain unit 62 according to the embodiment of the present invention may further include a chain driving part 623. The chain driving part 623 is coupled to the chain pulley part 621 to rotate the chain pulley part 621 in a forward direction or a reverse direction.

In more detail, in initial entry of the rice paper 100, the chain driving part 623 may rotate the chain contact part 622 in the reverse direction for a predetermined time and then rotate the chain contact part 622 in the forward direction. As an example, when the chain contact part 622 is rotated in the reverse direction, the chain contact part 622 disposed on the lower side may roll the rice paper 100 including the stuffing 200 several times while moving in a direction opposite to the progress direction of the movement belt unit 21 and thus may induce an initial rolled state of the rice paper 100. Next, when the chain contact part 622 is rotated in the forward direction, the chain contact part 622 disposed on the lower side may guide the rice paper 100 including the stuffing 200 to be introduced between the support passage parts 612 while moving the same direction as the progress direction of the movement belt unit 21.

The rotation chain unit 62 according to the embodiment of the present invention may further include a chain pressing part 624. One or more chain pressing parts 624 are arranged in a lengthwise direction of the rotation support unit 61 and press the chain contact part 622 by their own weight to maintain a contact state between the chain contact part 622 and the rice paper 100.

As an example, a plurality of passage hole parts 619 may be formed in the lengthwise direction of the support passage parts 612, and the passage hole parts 619 may be formed to have a vertical length. Further, the chain pressing part 624 may pass through the passage hole part 619, may then be moved downward, and may press the chain contact part 622. The chain pressing part 624 has various weights and may be replaced and then used according to a working situation.

The rotation unit 60 according to the embodiment of the present invention may further include a rotation spraying unit 63. The rotation spraying unit 63 sprays a gas onto the rice paper 100 moved through the movement unit 20. As an example, the rotation spraying unit 63 may spray a gas onto a tip of the rice paper 100 so that the tip of the rice paper 100 surrounds the stuffing 200. In addition, the rotation spraying unit 63 may spray a gas onto the rice paper 100 at various angles and thus guide the rice paper 100 so that the rice paper 100 stably surrounds the stuffing 200 before coming into contact with the rotation chain unit 62.

The rotation unit 60 according to the embodiment of the present invention may further include a rotation discharge part 64. The rotation discharge unit 64 prevents the rice paper 100 from deviating from a set path of being moved to the rotation chain unit 62.

The rotation discharge unit 64 according to the embodiment of the present invention includes a normal discharge part 641 and a defective discharge part 642.

The normal discharge part 641 is arranged as a pair of normal discharge parts 641 facing each other, is disposed between the support passage parts 612, and guides the rice paper 100 including the stuffing 200 to the rotation support unit 61. As an example, one end of the normal discharge part 641 may protrude from an end of the support passage part 612 in a direction toward the folder unit 50.

The defective discharge part 642 extends outward from an end of the normal discharge part 641 and discharges the rice paper 100 deviating from the set path to the outside. As an example, the defective discharge part 642 may extend from the end of the normal discharge part 641 to have an inclination, and the rice paper 100 caught by the defective discharge part 642 may be guided to the defective discharge part 642 and then collected or discarded.

A spring roll making process using the spring roll making apparatus having the above configuration will be described as follows.

When the supply unit 10 supplies the rice paper 100, the movement unit 20 moves the rice paper 100. That is, the supply unit 10 automatically supplies the dried rice paper 100, and the rice paper 100 is moved through the movement unit 20. In this case, the rice paper 100 may have corners formed at a front end and a rear end thereof.

The rice paper 100 moved through the supply unit 10 and the movement unit 20 is softened through the softening unit 30. When the rice paper 100 is completely softened, the input unit 40 inputs the stuffing 200 in the rice paper 100.

The rice paper 100 on which the stuffing 200 is seated is continuously moved by the movement unit 20 and is folded by the folder unit 50. The rice paper 100 folded by the folder unit 50 surrounds the stuffing 200 while being rotated by the rotation unit 60.

That is, while sequentially passing through the folder unit 50 and the rotation unit 60 by the movement unit 20, the rice paper 100 can surround the stuffing 200 to correspond to the length of the stuffing 200.

Although the present invention has been described with reference to embodiments illustrated in the drawings, the description is merely illustrative, and those skilled in the art to which the technology belongs could understand that various modifications and other equivalent embodiments may be made. Thus, the true technical scope of the present invention should be determined by the appended claims.

The invention claimed is:
1. A spring roll making apparatus comprising:
   a supply unit that supplies each rice paper, the supply unit comprising:
      a supply guide unit;
      a supply replenishment unit mounted on the supply guide unit, wherein the supply replenishment unit moves the rice paper along the supply guide unit and replenishes the rice paper,
      a supply standby unit mounted on the supply guide unit, wherein the supply standby unit maintains the rice paper supplied from the supply replenishment unit in a standby state; and
      a supply transfer unit mounted on the supply guide unit and capable of moving each of the rice papers stacked on the supply standby unit to the softening unit;
   a movement unit disposed adjacent to and downstream of the supply unit, wherein the movement unit moves the rice paper supplied through the supply unit;
   a softening unit disposed downstream of the supply unit, wherein at least a portion of the softening unit is above or below at least a portion of the movement unit, and wherein the softening unit induces softening of the rice paper moved through the movement unit;
   an input unit disposed downstream of the softening unit, wherein at least a portion of the input unit is above at least a portion of the movement unit such that the input unit inputs stuffing into the rice paper softened by the softening unit and moved by the movement unit;
   a folder unit disposed downstream of the input unit, wherein at least a portion of the folder unit is above at least a portion of the movement unit such that the folder unit folds the rice paper on which the stuffing is seated and which is moved by the movement unit; and
   a rotation unit disposed above at least a portion of the movement unit and downstream of the folding unit, wherein the rotation unit rolls the rice paper passing through the folder unit and moved through the movement unit,
   wherein a belt of the movement unit is in material communication with each of the supply unit, the softening unit, the input unit, the folder unit, and the rotation unit such that the movement unit conveys the rice paper from the supply unit to each of the softening unit, the input unit, the folder unit, and the rotation unit.

2. The spring roll making apparatus of claim 1, wherein the supply guide unit comprises:
   a guide duct part mounted to each of the supply replenishment unit, the supply standby unit, and the supply transfer unit;
   a guide rod part disposed in a lengthwise direction of the guide duct part and guides the supply replenishment unit; and
   a guide rail part formed in the guide duct part, wherein the guide rail part is configured to guide the movement of the rice paper.

3. The spring roll making apparatus of claim 1, wherein the supply replenishment unit comprises:
   a replenishment driving part mounted on the supply guide unit, wherein the replenishment driving part is configured to provide power when power is applied; and
   a replenishment guide part coupled to the replenishment driving part, wherein the replenishment guide part is configured to reciprocate in a lengthwise direction of the supply guide unit by the replenishment driving part and to guide the rice paper to the supply standby unit.

4. The spring roll making apparatus of claim 1, wherein the supply standby unit comprises:
   a standby elevation part mounted on the supply guide unit and comprising a flat surface, wherein the standby elevation part is vertically moved and moves the rice paper moved through the supply replenishment unit upward on the flat surface; and a standby support part mounted on the supply guide unit and supports an uppermost end of the rice paper moved upward via a standby sensor part and a standby control unit coupled to the standby support part.

5. The spring roll making apparatus of claim 1, wherein the supply transfer unit comprises:

a transfer adsorption part disposed above an uppermost rice paper of a stack of rice papers in the supply unit such that the transfer adsorption part is capable of adsorbing an uppermost rice paper of the stacked rice papers; and a transfer belt part disposed below the transfer adsorption part, wherein the transfer belt part comprises one or more components configured to move the rice paper supplied through the transfer adsorption part.

6. The spring roll making apparatus of claim 1, wherein the softening unit comprises:

a softening spraying unit disposed above or below the belt of the movement unit and comprises a fluid outlet such that the softening spraying unit is capable of spraying hot water onto the rice paper moved through the supply unit; and a softening steam unit disposed above or below the belt of the movement unit such that the softening steam unit is capable of dispensing steam to the rice paper.

7. The spring roll making apparatus of claim 6, wherein the softening steam unit comprises:

a plurality of steam stand parts;

a steam water tank part structurally-supported by the steam stand parts, wherein the steam water tank part covers the movement unit, and comprises a water storage compartment;

a steam heating part mounted on and in thermal communication with the steam water tank part such that the steam heating part is configured to heat water in the steam water tank part; and a steam circulation part mounted on and in fluid communication with the steam water tank part and circulates steam.

8. The spring roll making apparatus of claim 1, wherein the folder unit comprises:

a folder support unit configured to prevent lateral movement of the stuffing and/or the rice paper during a folding operation;

a folder pressing unit disposed above the belt of the movement unit and configured to press a left wing and a right wing of the rice paper; and a folder spraying unit disposed below the belt of the movement unit and configured to spray air in a vertical direction onto the left wing and the right wing of the rice paper.

9. The spring roll making apparatus of claim 8, wherein the folder support unit comprises:

a folder driving part disposed above the moved rice paper on the belt, wherein the folder driving part is configured to move in a progress direction of the rice paper; and a folder contact part mounted on a lateral surface of the folder driving part and extending in a vertical direction away from the folder driving part, wherein the folder contact part is configured to press the stuffing while moving in the progress direction of the rice paper.

10. The spring roll making apparatus of claim 8, wherein the folder pressing unit comprises:

a pressing operation part disposed above the moved rice paper and has a variable vertical length;

a pressing rod part mounted on the pressing operation part and has a height adjusted as the pressing operation part is operated, wherein the pressing rod part is disposed perpendicular to a progress direction of the belt of the movement unit; and a pressing part mounted on the pressing rod part and extending parallel to the belt of the movement unit, wherein the pressing part is configured to press the left wing and the right wing of the rice paper.

11. The spring roll making apparatus of claim 1, wherein the rotation unit comprises:

a rotation support unit mounted on the movement unit and disposed above the rice paper; and a rotation chain unit mounted on the rotation support unit, has a length in a progress direction of the rice paper, and guides the moved rice paper to be caught and dried.

12. The spring roll making apparatus of claim 11, wherein the rotation chain unit comprises:

a plurality of chain pulley parts rotatably mounted on the rotation support unit; and a chain contact part contacting the plurality of chain pulley parts such that the chain contact part rotates in a caterpillar manner while being wound on the chain pulley parts, wherein a portion of the chain contact part is proximate to one or more chain pressing parts such that a second portion of the chain contact part maintains contact with the rice paper, wherein the second portion of the chain contact part is capable of rolling the rice paper moved through the movement unit while in contact with the rice paper.

13. The spring roll making apparatus of claim 11, wherein the rotation unit further comprises:

a rotation spraying unit disposed upstream of the rotation chain unit, wherein the rotation spraying unit is configured to spray a gas onto the rice paper moved through the movement unit; and a rotation discharge unit coupled to the rotation support unit adjacent to the rotation spraying unit, wherein the rotation discharge unit comprises a first portion extending from the rotation support unit that prevents the rice paper from deviating from a set path of being moved to the rotation chain unit.

14. A spring roll making apparatus of comprising:

a supply unit that supplies each rice paper, the supply unit comprising:

a supply guide unit:

a supply replenishment unit mounted on the supply guide unit, wherein the supply replenishment unit moves the rice paper along the supply guide unit and replenishes the rice paper, a supply standby unit mounted on the supply guide unit, wherein the supply standby unit maintains the rice paper supplied from the supply replenishment unit in a standby state; and a supply transfer unit mounted on the supply guide unit, wherein the supply transfer unit moves each of the rice papers stacked on the supply standby unit to the softening unit;

a movement unit disposed adjacent to and downstream of the supply unit, wherein the movement unit moves the rice paper supplied through the supply unit;

a softening unit disposed downstream of the supply unit, wherein at least a portion of the softening unit is above or below at least a portion of the movement unit, wherein the softening unit induces softening of the rice paper moved through the movement unit;

an input unit disposed downstream of the softening unit, wherein at least a portion of the input unit is above at least a portion of the movement unit such that the input unit inputs stuffing into the rice paper softened by the softening unit and moved by the movement unit, wherein the input unit comprises:
  an input provision unit located adjacent to and in solid communication with an input cutting unit, wherein the input provision unit is configured to supply the stuffing to the input cutting unit;
  the input cutting unit located downstream of the input provision unit such that cuts and subdivides the stuffing discharged from the input provision unit;
  an input belt unit extending from the input cutting unit to an input stopper unit, wherein the input belt unit guides the subdivided stuffing; and
  the input stopper unit located downstream of the input cutting unit, wherein the input stopper unit stops the stuffing moved through the input belt unit; and
  an input dropping unit located adjacent to the input stopper unit such that the input dropping unit is capable of drop ping the stuffing, of which movement is stopped by the input stopper unit, from the input belt unit, a folder unit disposed downstream of the input unit, wherein at least a portion of the folder unit is above at least a portion of the movement unit such that the folder unit folds the rice paper on which the stuffing is seated and which is moved by the movement unit; and a rotation unit disposed above at least a portion of the movement unit and downstream of the folding unit, wherein the rotation unit rolls the rice paper passing through the folder unit and moved through the movement unit, and wherein a belt of the movement unit is in material communication with each of the supply unit, the softening unit, the input unit, the folder unit, and the rotation unit such that the movement unit conveys the rice paper from the supply unit to each of the softening unit, the input unit, the folder unit, and the rotation unit.

15. The spring roll making apparatus of claim 14, wherein the input provision unit comprises:
  a provision injection part comprising a compartment into which the stuffing is input;
  a provision guide part connected to and in material communication with the provision injection part such that the provision guide part is configured to guide the stuffing from the provision injection part; and
  a provision operation part inserted into the provision guide part and configured to discharge the stuffing stored in the provision guide part through an opening at an end of the provision guide part.

16. The spring roll making apparatus of claim 14, wherein the input cutting unit comprises:
  a cutting driving part of which a vertical length is variable;
  a cutting link part rotatably mounted on the cutting driving part and having a height adjusted according to a length of the cutting driving part;
  a cutting blade part formed in and extending from the cutting link part and cuts the stuffing; and
  a cutting rotation part connected to the cutting link part and mounted in the provision guide part or a separate fixture such that a length of the cutting rotation part is adjusted via vertical movement, wherein the cutting rotation part is configured to vary a length thereof to rotate the cutting link part.

17. The spring roll making apparatus of claim 14, wherein the input dropping unit comprises:
  a dropping operation part disposed above the input belt unit and to intersect the input belt unit, wherein the dropping operation part has a variable length; and
  a dropping plate part mounted on the dropping operation part, wherein the dropping plate part protrudes downward to the input belt unit, and wherein the dropping plate part is configured to linearly move via operation of the dropping operation part such that the dropping plate part pushes the stuffing stopped in the input belt unit by the input stopper unit.

18. The spring roll making apparatus of claim 14, wherein the input unit further comprises an input alignment unit comprising a plurality of components configured to align the stuffing dropped onto the rice paper.

19. The spring roll making apparatus of claim 18, wherein the input alignment unit comprises:
  an alignment rotation part rotatably mounted above the belt of the movement unit; and
  an alignment rod part coupled to and protruding from the alignment rotation part, wherein the alignment rod part is configured to align the stuffing while in contact with the stuffing dropped onto the rice paper.

20. A spring roll making apparatus comprising:
  a supply unit that supplies each rice paper, wherein the supply unit includes:
    a supply guide unit;
    a supply replenishment unit that moves the rice paper along the supply guide unit and replenishes the rice paper;
    a supply standby unit mounted on the supply guide unit and maintains the rice paper supplied from the supply replenishment unit in a standby state; and
    a supply transfer unit mounted on the supply guide unit and moves each of the rice papers stacked on the supply standby unit to the softening unit;
  a movement unit that moves the rice paper supplied through the supply unit;
  a softening unit that induces softening of the rice paper moved through the movement unit;
  an input unit that inputs stuffing into the rice paper softened by the softening unit and moved by the movement unit;
  a folder unit that folds the rice paper on which the stuffing is seated and which is moved by the movement unit; and
  a rotation unit disposed above the movement unit and rolls the rice paper passing through the folder unit and moved through the movement unit.

* * * * *